United States Patent
Popa et al.

(10) Patent No.: US 8,539,854 B2
(45) Date of Patent: Sep. 24, 2013

(54) MICROROBOTS WITH LARGE ACTUATION VOLUMES, AND CONTROLLERS, SYSTEMS, AND METHODS

(75) Inventors: Dan O. Popa, Roanoke, TX (US); Rakesh Murthy, Arlington, TX (US)

(73) Assignee: Board of Regents, The University of Texas System, Austin, TX (US)

(*) Notice: Subject to any disclaimer, the term of this patent is extended or adjusted under 35 U.S.C. 154(b) by 792 days.

(21) Appl. No.: 12/587,314

(22) Filed: Oct. 5, 2009

(65) Prior Publication Data

US 2010/0126297 A1 May 27, 2010

Related U.S. Application Data

(60) Provisional application No. 61/103,014, filed on Oct. 6, 2008.

(51) Int. Cl.
*G01Q 10/00* (2010.01)

(52) U.S. Cl.
USPC .............................................. 74/490.08; 850/1

(58) Field of Classification Search
USPC ............... 74/490.01, 490.04, 490.08, 490.09, 74/89.2; 901/21; 850/1
See application file for complete search history.

(56) References Cited

U.S. PATENT DOCUMENTS

| | | | | |
|---|---|---|---|---|
| 4,721,005 A * | 1/1988 | Yoshiji et al. | ............. | 74/490.04 |
| 5,611,248 A * | 3/1997 | Peltier | ........................ | 74/490.09 |
| 6,490,118 B1 | 12/2002 | Ell et al. | ...................... | 360/77.04 |
| 6,590,212 B1 | 7/2003 | Joseph et al. | ............ | 250/442.11 |
| 6,674,077 B1 | 1/2004 | Joseph et al. | ................. | 250/311 |
| 6,874,668 B2 | 4/2005 | Cumings et al. | .............. | 428/403 |
| 7,093,827 B2 | 8/2006 | Culpepper | ...................... | 403/52 |
| 7,196,454 B2 | 3/2007 | Baur et al. | ............... | 310/323.01 |
| 7,220,973 B2 | 5/2007 | Yu et al. | ................... | 250/442.11 |
| 7,227,140 B2 | 6/2007 | Skidmore et al. | ............. | 250/307 |
| 7,238,425 B2 | 7/2007 | Cumings et al. | .............. | 428/403 |
| 7,270,319 B2 | 9/2007 | Culpepper | ..................... | 267/160 |
| 7,326,293 B2 | 2/2008 | Randall et al. | ................... | 117/55 |
| 7,451,596 B2 | 11/2008 | Culpepper et al. | .............. | 60/527 |
| 7,538,470 B2 | 5/2009 | Sarkar | ........................... | 310/311 |
| 7,557,470 B2 | 7/2009 | Culpepper et al. | .............. | 310/15 |
| 8,042,425 B2 * | 10/2011 | Dujardin | .................... | 74/490.09 |

OTHER PUBLICATIONS

Abbott et al., "Robotics in the small, part 1: microrobotics," *IEEE Robotics & Automation Magazine*, 14 (2): 92-103, 2007.

Ando, "Development of three-dimensional electrostatic stages for scanning probe microscope," *Sensors Actuators A physical*, 114: 285-291, 2004.

Ataka et al., "Fabrication and Operation of Polyimide Bimorph Actuators for a Ciliary Motion System," *J. of Microelectromechanical Systems*, 2 (4): 146-150, 1993.

Beyeler et al., "Monolithically fabricated micro-gripper with integrated force sensor for manipulating micro-objects and biological cells aligned in an ultrasonic field," *IEEE/ASME Journal of Microelectromechanical Systems (JMEMS)*, 16 (1): 7-15, 2007.

(Continued)

*Primary Examiner* — Justin Krause
(74) *Attorney, Agent, or Firm* — Fulbright & Jaworski, LLP

(57) ABSTRACT

Robots, and atomic force microscopes including robots, that utilize in-plane actuators to provide large out-of-plane working volumes and forces.

19 Claims, 18 Drawing Sheets

(56) References Cited

OTHER PUBLICATIONS

Böhringer et al., "Single-Crystal Silicon Actuator Arrays for Micro Manipulation Tasks," *Proc. of IEEE Workshop on Micro Electro Mechanical Systems (MEMS)*, San Diego, CA, 7-12, , 1996.

Bonvilain and Chaillet, "Microfabricated Thermally Actuated Microrobot," *Proceedings of the IEEE International Conference on Robotics and Automation*, Taipei, Taiwan, Sep. 14-19, 2003.

Crespi et al., "Top-down vs. bottomup methodologies in multi-agent system design," *J. of Autonomous Robots*, 24 (3): 303-313, Apr. 2008.

Das et al., "On the precision alignment and hybrid assembly aspects in manufacturing of a microspectrometer," *Proceedings of IEEE conference on Automation Science and Engineering (CASE)*, 959-966, Washington DC, USA.

Das et al.,"$\mu^3$: multiscale deterministic micronano assembly system for construction of on-water microrobots," *IEEE International Conference on Robotics and Automation*, 10 (14): 461-466, Roma, Italy, Apr. 2007.

De Lit et al., "A four-year degree of freedom microprehensile microrobot on chip," *Journal of Assembly Automation*, 24 (1): 33-42, 2004.

Dechev et al., "Microassembly of 3D MEMS structures utilizing microgripper with a robotic manipulator," *J. Of Microelectromechanical Systems*, 13 (2): 2004.

Despont et al., "VLSI-NEMS chip for parallel AFM data storage," *Sens. Actuators*, 80: 100-107, 2000.

Donald et al., "An untethered, electrostatis, globally-controllable MEMS microrobot," Journal of Microelectromechanical Systems, 15 (1): 2006.

Dong et al., "Design, fabrication and testing of a slicon-on-insulator (SOI) MEMS parallel kinematics XY stage," *Journal of Micromech, Microeng.*, 17: 1154-1161, 2007.

Drexler, "Engines of creation: the coming era of nanotechnology," http://e-drexler.com/d/06/00/EOC/EOC_Table_of_Contents.html, 1987.

Driesen et al., "Friction Based locomotion Module for Mobile MEMS Robots," *Proc. of IEEE/RSJ International Conference*, San Diego, CA, 3815-3820, Oct. 29-Nov. 2, 2007.

Ebefors et al., "A Robust Micro Conveyer Realized by Arrayed Polyimide Joint Actuators," *Journal of Micromechanics and Microengineering*, 10 (3): 337-349, 2000.

Ebefors et al., "A Robust Micro Conveyor Realized by Arrayed Polyimide Joint Actuators," *Proc. of IEEE 12th Workshop on Micro Electro Mechanical Systems (MEMS)*, 576-581, 1999.

Fan et al., "Selfassembled microactuated XYZ stage for optical scanning and alignment," Proc. Int . Conf. Solid-state Sensor and Actuators, 319-322, 1997.

Fatikow et al., "A Flexible microrobot-based microassembly station," *Journal of Intelligent and Robotoic Systems*, 27 (1-2): 2000.

Floyd et al., "An untethered magnetically actuated micro-robot capable of motion on arbitrary surfaces," *IEEE International Conference on Robotics and Automation*, 2008.

Full, "Using Biological Inspiration to Build Artificial Life that Locomotes," *LNCS*, 2217: 110-120, 2001.

Furuhata et al., "Array-driven Ultrasonic Microactuators," *Proc. of the 9th International Conference on Solid-State Sensors and Actuators*, 1: 1056-1059, 1991.

Garcia et al., "The evolution of robotics research," *Robotics & Automation Magazine*, 14 (1): 90-103, 2007.

Gauthier et al., "Submerged robotic micromanipulation and dielectrophoretic micro-object release," *9th International Conference on Control, Automation, Robotics and Vision*, 2006.

Gholipour and Yazdanpanah, "Dynamic Tracking Control of Nonholonomic Mobile Robot with Model Reference Adaptation for Uncertain Parameters," *Proceedings of ECC2003: European Control Conference*, Cambridge, UK, Sep. 2003.

Godhavn et al., "Path Planning for Nonholonomic Systems with Drift," *Proceedings of the American Control Conference*, 532-536, Jun. 1997.

Grochowski and Hoyt, "Future trends in hard disk drives," *IEEE Trans. Magn.*, 32: 1850-1854, 1996.

Hoover et al., "A rapidly prototyped 2-axis positioning stage for microassembly using large displacement compliant mechanisms," *Proceedings of IEEE International Conference on Robotics and Automation*, Orlando, Florida, May 2006.

Hosaka et al., "SPM-based data storage for ultrahigh density recording," *Nanotechnology*, 8: A58-62, 1997.

http://www.asylumresearch.com/Products/Mfp3DSA/Mfp3DSA.shtml.

http://www.parkafm.com/.

http://www.veeco.com/pdfs/brochures/B068-REv-A0-ICON-brochure-LowRes.pdf.

Indermühle et al., "Design and fabrication of an overhanging xyactuator with integrated tip for scanning surface profiling," *Sens. Actuators*, 43: 346-349, 1994.

Judy, "Micromechanisms using sidewall beams," PHD Dissertation, Faculty of Electrical Engineering and Computer Sciences, University of California, Berkeley, CA.

Jungen et al., "A MEMS actuator for integrated carbon nanotube strain sensing," *IEEE Sensors*, 2005.

Kladitis and Bright, "Prototype Microrobotics for Micro Positioning in a Manufacturing Process and Micro Unmanned Vehicles," *Sensors and Actuators*, 80: 132-137, 2000.

Konishi and Fujita, "A Conveyance System Using Air Flow Based on the Concept of Distributed Micro Motion Systems," *J. of Microelectromechanical System*, 3 (2): 54-58, 1994.

Lee et al., "Micropeg manipulation with a compliant microgripper," *Proceedings of IEEE International Conference on Robotics and Automation*, Washington, D.C., USA, 2002.

Legtenberg et al., "Comb-drive actuators for large displacements," *J. Micromech. Microeng.*, 6, 320, 1996.

Liu et al., "A Micromachined Permalloy Magnetic Actuator Array for Micro Robotics Assembly Systems," *The 8th International Conference on Solid-State Sensors and Actuator, and Eurosensors IX*, Stockholm, Sweden, 328-331, Jun. 25-29, 1995.

Liu, "A MEMS stage for 3-axis nanopositioning," *Proceedings of the 3rd Annual IEEE conference on Automation Science and Engineering*, 1087-1092, 2007.

Lizarralde et al., "Feedback Stabalization of Nonholonomic Systems," *Proceedings of the 1996 Conference of Infomration Sciences and Systems*, Princeton, New Jersey, 1-6, Mar. 1996.

Luntz et al., "Distributed Manipulation Using Discrete Actuator Arrays," *The International Journal of Robotics Research*, 20: 553-583, 2001.

McMichael and Francis, "Micro Air Vehicles—Toward a New Dimension in Flight," *DARPA Report*, 1997.

Mohebbi et al., "Omnidirectional Walking Microrobot Realized by Thermal Microactuator Arrays," *Proc. of ASME International Mechanical Engineering Congress and Exposition*, 1-7, Nov. 11-16, 2001.

Murthy and Popa "Millimeter-Scale Microrobots for Wafer-Level Factories," in Prof. of IEEE International Conf on Robotics and Automation (ICRA), Anchorage, Alaska, May 2010.

Murthy and Popa, "A four degree of freedom microrobot with large work volume," *IEEE International Conference on Robotics and Automation*, May 2009.

Murthy and Popa, "Articulated MEMS Robot for Microfactory Applications," *Proceedings of ASME IDETC Micro & Nano Systems Conference*, San Diego, 1-7, Aug. 2009.

Murthy et al., "ARRIpede: a stick-slip microcrawler/conveyor robot constructed via 2 ½ D MEMS assembly," *IEEE/RSJ International Conference on Intelligent Robots and Systems*, 2008.

Murthy et al., "ARRIpede: an Assembled Micro Crawler," *Automation and Robotics Research Institute*, 833-836, 2008.

Murthy et al., "High yield assembly of compliant MEMS snap fasteners," *Proceedings of the ASME International Design Engineering Technical Conferences & Computers and Information in Engineering Conference*, Brooklyn, New York, USA, Aug. 2008.

Murthy et al., "$M^3$: multiscale, deterministic and reconfigurable macro-micro assembly system for packaging of MEMS," *Proceedings of IEEE International Conference on Robotics and Automation*, Roma, Italy, Apr. 2007.

Murthy et al., "Nonholonomic Control for an Assembled Microcrawler," to appear in Prof of IFAC '09, Int'l Federation on Automatic Control Conference, Gifu, Japan, Sep. 2009.

Papadopoulos et al., "On Path Planning and Obstacle Avoidance for Nonholonomic Platforms with Manipulators," *International Journal of Robotics Research*, 21 (4): 367-386, 2002.

Pappas and Kyriakopoulos, "Modeling and Feedback Control of Nonholonomic Mobile Vehicles," *Proceedings of the 31st Conference on Decision and Control*, Tuscon, AZ, 2680-2685, 1992.

Popa and Stephanou, "Micro and Meso Scale Robotic Assembly," *SME Journal of Manufacturing Processes*, 6 (1): 52-71, 2004.

Popa et al., "Dynamic Modeling and Input Shaping of Thermal Bimorph MEMS Actuators," *Proc. of IEEE International Conference on Robotics & Automation*, Taipei, Taiwan, Sep. 2003.

Popa et al., "Precision-Driven Hybrid Control for 3D Microassembly," presentation at Int'l Workshop on Control Issues in the Micro-Nano World, at IEEE ICRA, Kobe, Japan, May 2009.

Popa et. al. "$M^3, 1\mu^3$, and $N^3$: Top-down, Deterministic Macro to Nano Robotic Factories with Yield and Speed Adjusted Precision Metrics," in Proc. of 2008 Int'l Workshop on Microfactories (IWMF'08), Evanston, Illinois, Oct. 6-8, 2008.

Popa, "Toward wafer-scale robotic microfactories for nanomanufacturing," presentation at IEEE NMDC 2009 NanoRobotics Workshop, Traverse City, MI, Jun. 2, 2009.

Rabenorosoa et al., "Precise Motion Control of a Piezoelectric Microgripper for Microspectrometer Assembly," *Proceedings in ASME IDETC Micro & Nano Systems Conference*, San Diego, Aug. 30-Sep. 2, 2009.

Ried et al., "6-MHz 2-N/m piezoresistive atomic-force-microscope cantilevers with incisive tips," *J. Microelectromech. Syst.*, 6: 294-302, 1997.

Rizzi et al., "Agile assembly architecture: an agent-based approach to modular precision assembly systems," *Proceedings of IEEE International Conference on Robotics and Automation*, 2: 1511-1516, 1997.

Rothuizen et al., "Compact copper/epoxy-based electromagnetic scanner for scanning probe applications," *Proc. Micro Electro Mechanical Systems*, 582-584, 2002.

Rothuizen et al., "Fabrication of a micromachined magnetic X/Y/Z scanner for parallel scanning probe applications," *Microelectron. Eng.*, 53: 509-512, 2000.

Schmoeckel and Fatikow, "Smart Flexible Microrobots for SEM Applications," *Journal of intelligent Material Systems and Structures*, 3985: 142-151, 2000.

Schmoeckel et al., "The Scanning Electron Microscope as Sensor System for Mobile Microrobots," *8th IEEE Int. Conf on Emerging Technologies and Factory Automation*, ETFA 2001, Oct. 15-18, 2001.

Sitti and Hashimoto, "Teleoperated nano scale object manipulation," *Recent Advances on Mechatronics*, 1999.

Sitti, "Teleoperated and automatic nanomanipulation systems using atomic force microscope probes," *IEEE International Conference on Decision and Control*, 2003.

Stephanou, Micro and meso scale robotic assembly,: Winter Topical Meeting Center for Automation Technologies, Renssalaer Plytechnic Institute, 28: 108-112, 2003.

Takahashi et al., "Topological layer switch technique for monolithically integrated electrostatic XYZ stage," *Proc. IEEE MEMS*, 651-654, 2007.

Terris et al., "Atomic force microscope-based data storage: track servo and wear study," *Appl. Phys. A.*, 66: S809-S813, 1998.

Tsui et al., "Micromachined end-effector and techniques for directed MEMS assembly," *J. of Micromechanics and Microengineering*, 542-549, 2004.

Vettiger et al., "The millipede—more than one thousand tips for future AFM data storage," *IBM J. Res. Develop.*, 44: 323-340, 2000.

Wörn et al., "From Decimeter to Centimeter-sized Mobile Microrobots—the Development of the MINIMAN System," *Proc. SPIE*, 4568: 175-186, 2001.

Yaish et al., "Electrical nanoprobing of semiconducting carbon nanotubes using an atomic force microscope," *Applied Physics Letters*, 80: 4446, 2002.

Yeh et al., "Surface-micromachined components for articulated microrobots," *Journal of Microelectromechanical Systems*, 5 (1): 10-17, 1996.

Zhou et al., "Fusing force and vision feedback for micromnipulations," Proceedings of IEEE International Conferenceon Robotics and Automation, Leuven, Belgium, May 1998.

Das et al., "On the Precision Alignment and Hybrid Assembly Aspects in Manufacturing of a Microspectrometer", $4^{th}$ IEEE Conference on Automation Science Engineering, pp. 959-966, Aug. 23-36, 2008.

"MFP-3D™ Stand Along AFM: The Widest Range of AFM/SPM Capabilities Available Today", Asylum Research, accessed Feb. 9, 2010, http://ww.asylumresearch.com/Products/Mfp3DSA/Mfp3DSA.shtml.

"Park Systems Atomic Force Microscope, AFM/SPM", Park Systems, Accessed on Feb. 9, 2010, http://www.parkafm.com/New_html/main.php.

"Dimension Icon: Atomic Force Microscope System", Veeco, copyright 2009, accessed on Feb. 9, 2010, http://www.vecco.com/pdfs/brochures/B068-REv-A0-ICON-brochure-LowRes.pdf.

Judy, "Micromechanisms using sidewall beams", PHD Dissertation, Faculty of Electrical Engineering and Computer Sciences, University of California, Berkeley, CA, Apr. 26, 1994.

* cited by examiner

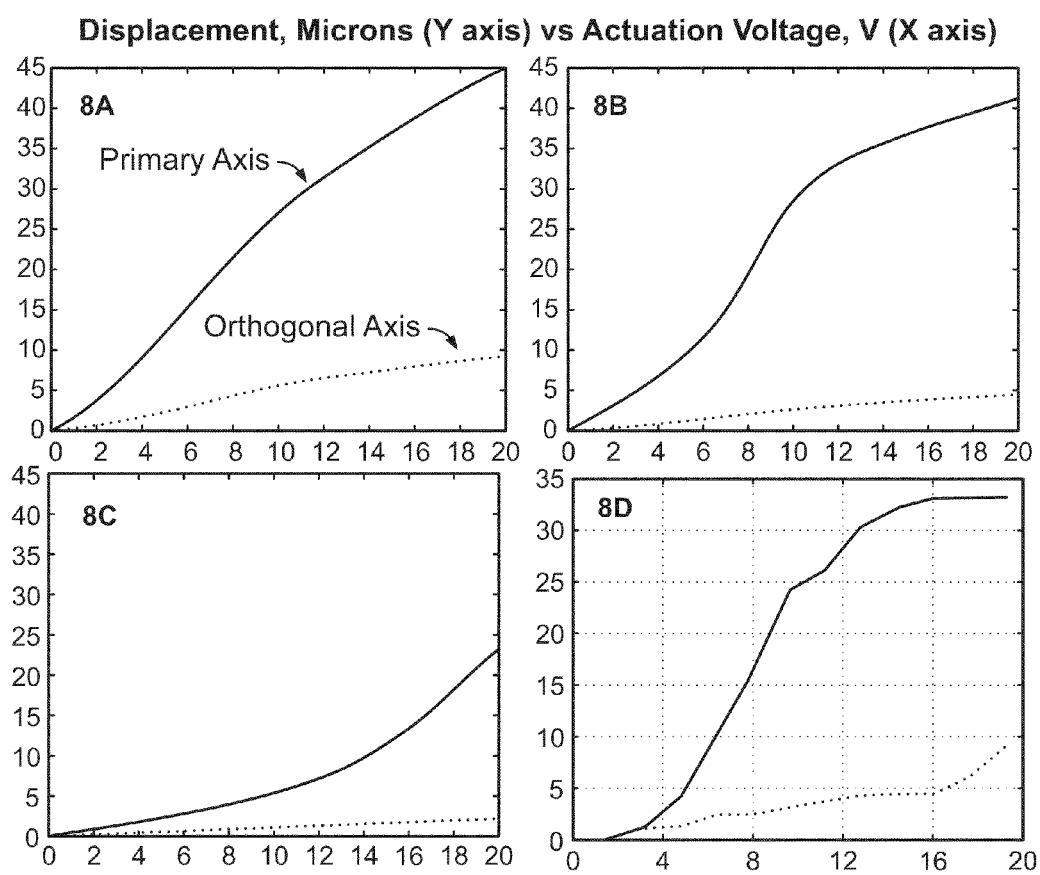
FIG. 8A-D

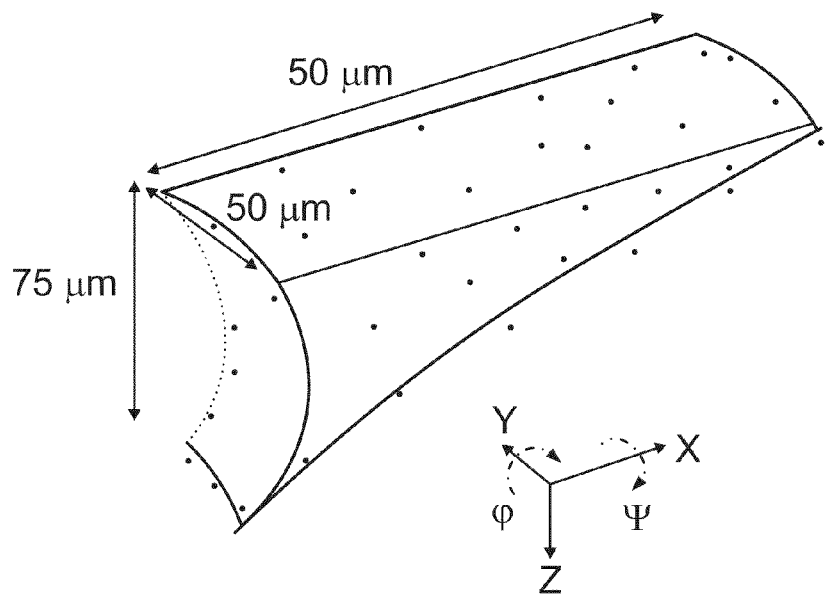
FIG. 13
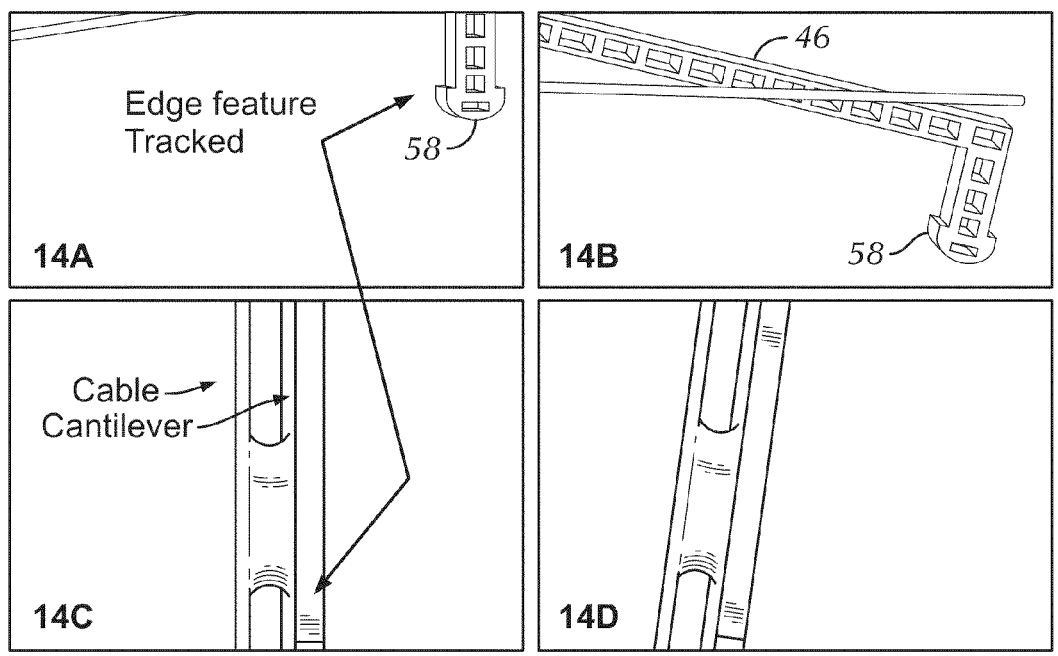
FIG. 14A-D

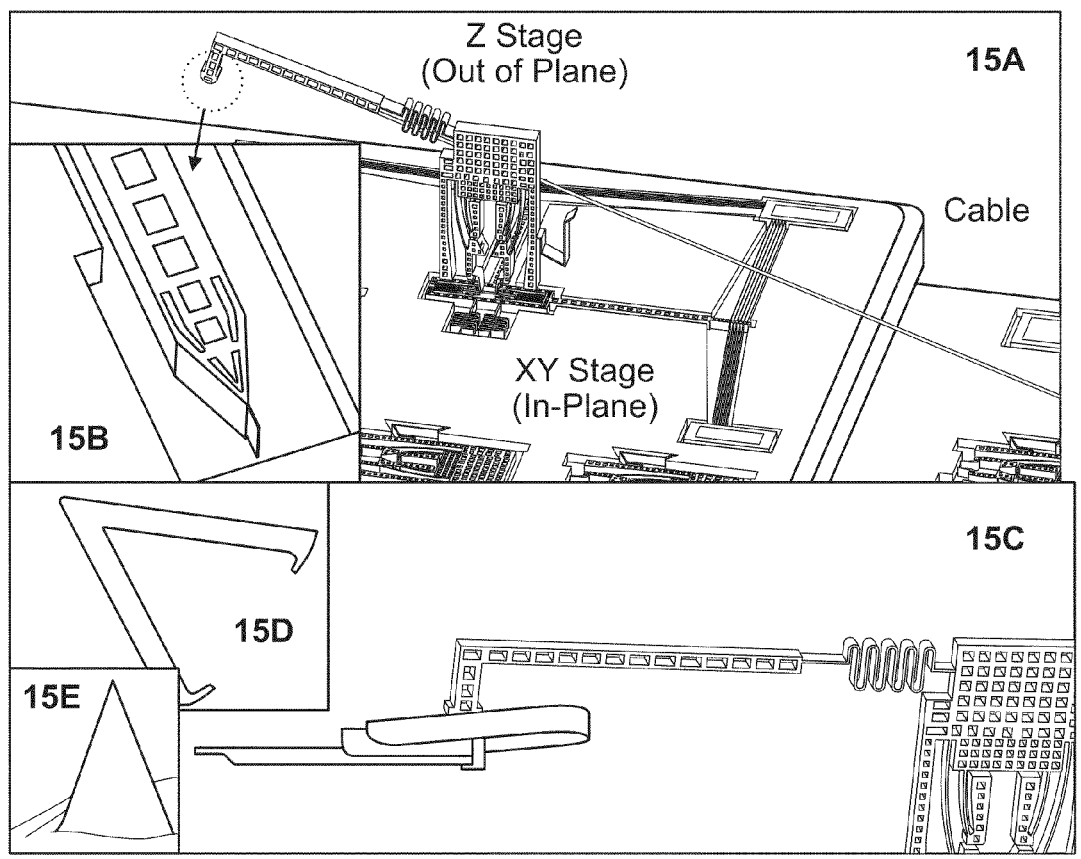
FIG. 15A-E

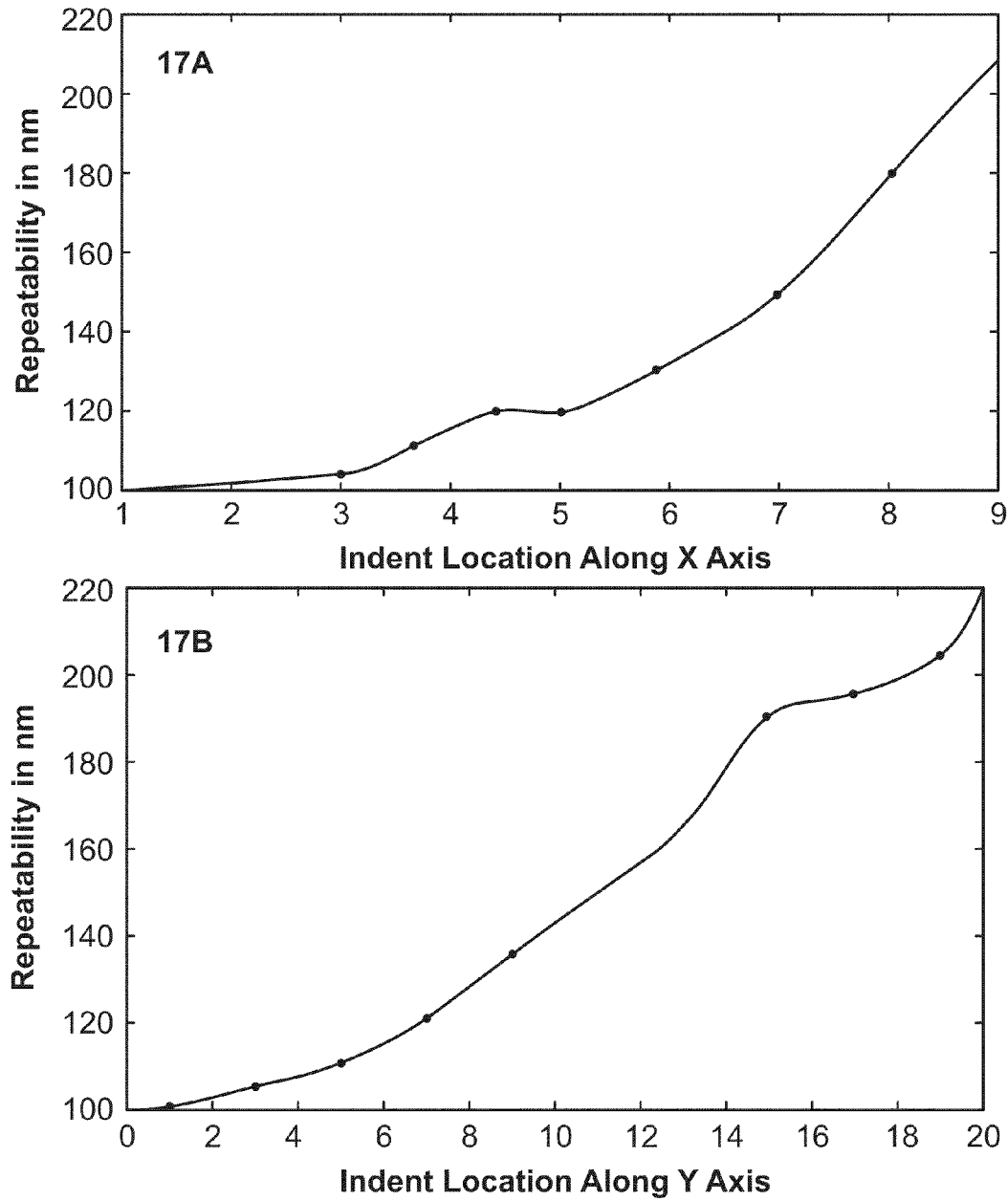
FIG. 17A-B

MICROROBOTS WITH LARGE ACTUATION VOLUMES, AND CONTROLLERS, SYSTEMS, AND METHODS

RELATED APPLICATIONS

This application claims priority to U.S. Provisional Application No. 61/103,014, filed Oct. 6, 2008, which is incorporated by reference in its entirety.

GOVERNMENT SUPPORT

This invention was made with government support under research grant #N00014-06-1-1150 awarded by the Office of Naval Research. The government has certain rights in the invention.

BACKGROUND OF THE INVENTION

1. Field of the Invention

The present invention relates generally to microrobots, and, more particularly, but not by way of limitation, to microrobots that are configured for micro- or nano-manipulation within a large actuation volume, and to methods, devices, and systems for such microrobots.

2. Description of Related Art

Robots have empowered manufacturing since the early 1960's when Unimation™ implemented a 1.5 m tall hydraulic manipulator to supply parts to die casting machines. Since then, robots have evolved with ever growing application areas such as industrial, medical, human-assistance, recreation, defense, etc. [1]. Over the past two decades, with the advent of microsystems and nanotechnology, precision requirements for robot manipulators have increased considerably, while robot sizes have generally decreased. Precision robots can be valuable tools for micro- and nano-manipulation [2], and for automated and teleoperated assembly [3-5]. More recently, micro- and nano-robots with sub-mm dimensions have been pursued [6-8].

Typical top-down micro- and nano-assembly hardware may use precision robots and end-effectors that are still many orders of magnitude larger than the size of the parts they manipulate [9]. With advances in Micro Electro Mechanical Systems (MEMS), new types of positioning stages have been proposed to aid nanoscale manipulation, probing and force measurement, optical microsystems, and high density data storage devices [10-11]. The design of such positioners often must balance key performance parameters such as range of motion, force output/payload capacity, and dexterity (degrees of freedom). A popular example of monolithically fabricated micropositioners is actuated using electrostatic comb-drives [11]. As a result, they have limited out-of-plane displacement outputs (e.g. mostly planar dexterity) [11]. Other examples include atomic force microscope (AFM) tips, which generally operate along a single vertical direction [12]. On the other hand, positioners with more than 3 degrees of freedom have been fabricated using thin-film deposition and etching, but they have limited force outputs, payload capacities, and reliability to operate as independent micromanipulators [13]. To overcome these inherent trade-offs, micro-positioners have been used as grippers or force probes in conjunction with larger conventional positioning stages, and therefore the overall dimensions of such manipulators typically spans several inches [14-15]. This is a severe limitation in applications requiring multiple such positioners within confined volumes, such as, for example, inside a scanning electron microscope (SEM) chamber.

SUMMARY

The present disclosure presents an articulated four-axis microrobot (AFAM) that can be operated without a macro-positioner.

Applications of the present robot embodiments include manipulation of micro or nanoscale objects such as MEMS components, nanoscale objects (like carbon nanotubes or nanospheres), or biological objects (such as cells, tissue samples, etc), in a confined, small environment such as inside a scanning electron microscope. Such embodiments of the present robots can be used to carry micro- and nano-tools, such as probes, grippers, proximity sensors, and the like, to investigate properties of micro/nano objects and/or manipulate them. Arrays of such probe-carrying manipulators can also be used in high density data storage applications.

Embodiments of the present robots comprise: a first actuator drive having a first shuttle and one or more in-plane actuators coupled to the first shuttle, the first actuator drive configured such that the one or more actuators are actuatable to move the first shuttle along a first plane; an arm having a base portion and a cantilever portion movably coupled to and extending from the base portion, the base portion coupled in fixed relation to the first shuttle of the first actuator drive; a second actuator drive having a second shuttle and one or more in-plane actuators coupled to the second shuttle, the second actuator drive configured such that the one or more actuators are actuatable to move the second shuttle along a second plane; a cable having a first end coupled to the second shuttle of the second actuator drive and a second end coupled to the cantilever portion of the arm.

In some embodiments, the second plane is substantially parallel to the first plane. In some embodiments, the second plane is substantially coplanar with the first plane. In some embodiments, the arm is substantially perpendicular to the first plane, and the arm is coupled to the first shuttle with a micro-snap fastener.

In some embodiments, the robot is configured such that first and second actuator drives are actuatable to: (i) translate the base portion of the arm along the first plane; and (ii) pivot the cantilever portion of the arm relative to the base portion of the arm. In some embodiments, the robot is configured such that the first and second actuator drives are actuatable to: (i) translate the base portion of the arm in at least two directions along the first plane; and (ii) pivot the cantilever portion of the arm relative to the base portion of the arm around at least two axes of rotation.

In some embodiments, the maximum dimensions of the robot do not exceed 3.2 millimeters (mm)×2.2 mm×1.2 mm, the cantilever portion of the arm comprises an end effector, and the robot is configured such that the actuator drives are actuatable to move the end effector laterally by at least 40 micrometers (µm), longitudinally by at least 40 µm, and vertically by at least 50 µm. In some embodiments, the maximum dimensions of the robot do not exceed 3 mm×2 mm×1 mm. In some embodiments, the robot is configured such that the actuator drives can be actuated to cause the end effector to apply at least 40 milliNewtons (mN) of force to an object in a direction substantially parallel to the first plane. In some embodiments, the robot is configured such that the actuator drives can be actuated to cause the end effector to apply at least 20 mN of force to an object in a direction substantially perpendicular to the first plane.

In some embodiments, the one or more in-plane actuators of the first actuator drive comprise: a first actuator configured to be actuated along a first axis; a second actuator configured to be actuated along a second axis that is substantially perpendicular to the first axis. In some embodiments, the one or more in-plane actuators of the second actuator drive comprise: a third actuator configured to be actuated along a third axis that is substantially parallel to the first axis; a second actuator configured to be actuated along a fourth axis that is substantially parallel to the second axis. In some embodiments, the actuators of the first and second actuator drives comprise electrothermal chevron actuators.

In some embodiments, the cantilever portion of the arm is coupled to the base portion of the arm with a two-axis flexure. In some embodiments, the cantilever portion, base portion, and flexure of the arm are of unitary construction. In some embodiments, the cable has a diameter between 20 µm and 40 µm. In some embodiments, the cable has a diameter between 25 µm and 35 µm.

Some embodiments of the present robots comprise: a first actuator drive having a first shuttle and two in-plane actuators coupled to the first shuttle, the first actuator drive configured such that the actuators are actuatable to move the first shuttle along a first plane; an arm having a base portion and a cantilever portion movably coupled to and extending from the base portion, the base portion coupled in fixed relation to the first shuttle of the first actuator drive; a second actuator drive having a second shuttle and two in-plane actuators coupled to the second shuttle, the second actuator drive configured such that the actuators are actuatable to move the second shuttle along the first plane; a cable having a first end coupled to the second shuttle of the second actuator drive and a second end coupled to the cantilever portion of the arm; where the maximum dimensions of the robot do not exceed 3.2 mm×2.2 mm×1.2 mm, the cantilever portion of the arm comprises an end effector, and the robot is configured such that the actuator drives are actuatable along the first plane to move the end effector laterally by at least 40 µm, longitudinally by at least 40 µm, and vertically by at least 50 µm.

Some embodiments of the present atomic force microscopes (AFMs) comprise: a robot (the robot comprising: a first actuator drive having a first shuttle and one or more in-plane actuators coupled to the first shuttle, the first actuator drive configured such that the one or more actuators are actuatable to move the first shuttle along a first plane; an arm having a base portion and a cantilever portion movably coupled to and extending from the base portion, the base portion coupled in fixed relation to the first shuttle of the first actuator drive, the cantilever portion having a distal end with a probe tip; a second actuator drive having a second shuttle and one or more in-plane actuators coupled to the second shuttle, the second actuator drive configured such that the one or more actuators are actuatable to move the second shuttle along a second plane; a cable having a first end coupled to the second shuttle of the second actuator drive and a second end coupled to the cantilever portion of the arm) and a detector module coupled to the robot for sensing the position of the probe tip.

Any embodiment of any of the present methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The structures that appears in photographs (e.g., those in FIGS. 1A, 4, 6A, 7B, 9B, 9C, 12, 14, 15(a)-15(e), and 16) as well as those in FIGS. 1B, 1C, 2, 3, and 19 are drawn to scale, meaning the sizes of the depicted elements are accurate relative to each other for at least the set of embodiments depicted in these figures.

FIGS. 8A-8D depicts depict charts of finite-element analysis (FEA) simulations of displacement of a chevron actuator suitable for use in embodiments of the present microrobots relative to actuation voltage.

FIG. 13 depicts the volumetric sweep of the cantilever of the vertical arm of the microrobot of FIG. 1.

FIGS. 14A-14D depict pictures of a portion of the cantilever of the vertical arm of the microrobot of FIG. 1 during various stages of actuation.

FIGS. 15A-15E depict pictures of various views of a prototype robot, and components of the prototype robot, configured for use in the present atomic force microscopes (AFMs).

FIGS. 17A-17B depict repeatability data obtained for the prototype robot.

DESCRIPTION OF ILLUSTRATIVE EMBODIMENTS

Figure 1A:
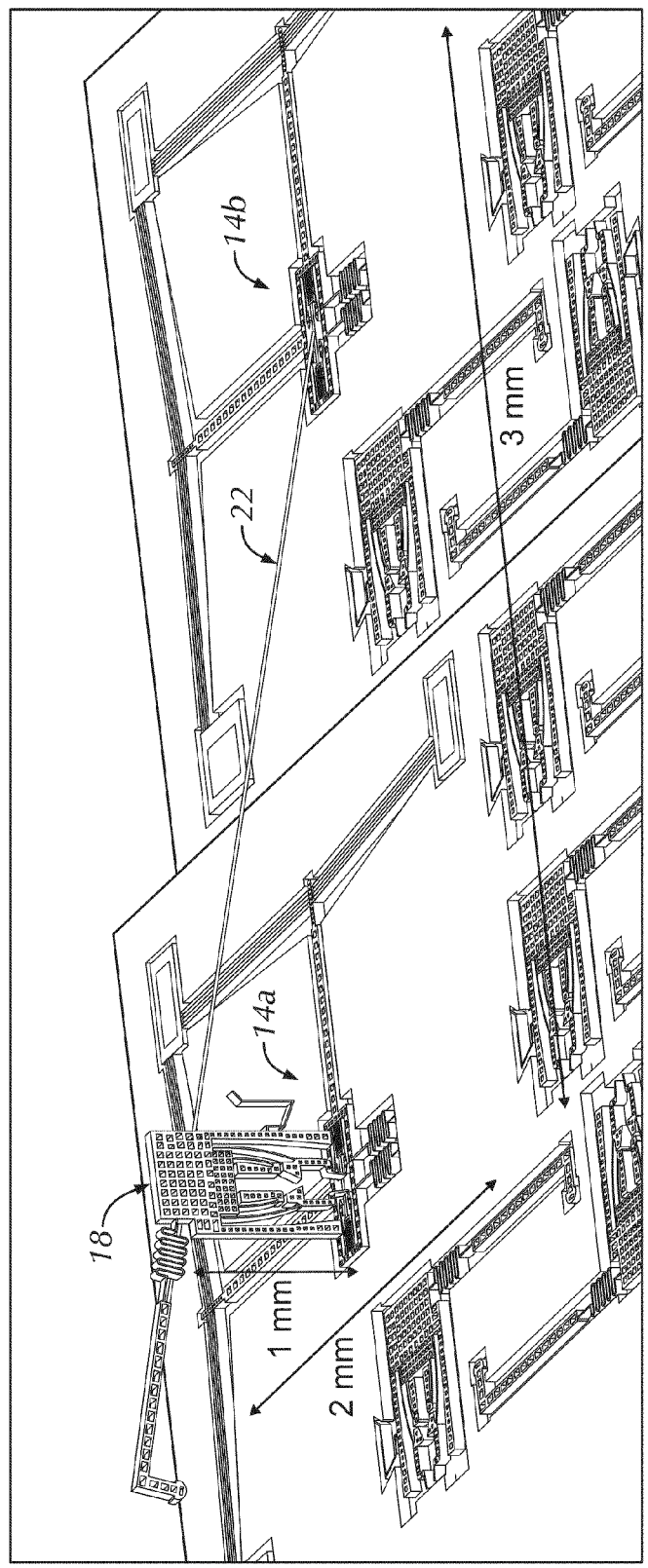
FIG. 1A depicts a picture of one of the present microrobots.

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a robot that "comprises," "has," "includes" or "contains" one or more elements possesses those one or more elements, but is not limited to possessing only those elements. For example, a robot that comprises two actuator drives, an arm, and a cable, can also include an AFM probe (e.g., coupled to the arm). Likewise, an AFM that "comprises," "has," "includes," or "contains" one or more elements possesses those one or more elements, but is not limited to possessing only those one or more elements. For example, a AFM that comprises one of the present robots, can also include more than one of the present robots.

Further, a device or structure that is configured in a certain way is configured in at least that way, but it can also be configured in other ways than those specifically described.

The present disclosure presents a unique four-axis articulated MEMS robot (e.g., constructed by microassembly techniques) for micro- and nano-scale manipulation and probing applications.

A prototype robot was assembled at UT Arlington's Texas Microfactory using $\mu^3$, a precision microassembly system [16]. The prototype covers a relatively large work volume, or approximately 50 μm×50 μm in the substrate plane, and 75 μm out of plane, has a total footprint of 3 mm×3 mm×1 mm (including actuators, transmission system and end-effector), and has four degrees of freedom (prismatic X/Y in plane, 'pitch' $\phi$ and 'yaw' $\psi$ both out of plane). The prototype robot can apply up to 50 mN of in-plane force in X and Y directions, and/or 25 mN in à Z direction, through an end-effector arm with a jammer tip. The microrobot joints are driven by four (4) electrothermal actuators, all of which are located in-plane on a die substrate (e.g., a silicon on insulator (SOI) die). Micro snap-fasteners and a cable-driven transmission drive the in-plane and out-of-plane flexure joints.

Remote actuation via cables can been used to transmit motion to joints which cannot be powered with a direct drive due to constraints such as speed/torque stepping and space. Since generating large out-of-plane motion with MEMS involves complex fabrication, the inventors employed a cable driven transmission as an alternative to out-of-plane flexure joints. Relatively simple fabrication processes were used to create 2½D, high aspect ratio microrobot links and in-plane actuators, hybrid 3D microassembly was used to construct strong joints and transmission systems. The resulting microrobot prototype has a workspace closer in shape to a cube than to a plane, and can address important requirements inside SEMs or microfactories by combining increased dexterity, a long range of motion, high resolution and repeatability in a modest self-volume.

The prototype, which represents one embodiment of the present microrobots, has what may be referred to in this disclosure as a 2P2R (Prismatic Prismatic Revolute Revolute) kinematic configuration, occupies a total volume of 3 mm×3 mm×1 mm, and operates within a workspace envelope of 50 μm×50 μm×75 μm. This is believed to be, by far, the largest operating envelope of any other independent micropositioner with non-planar dexterity. As a result, embodiments of the present microrobots can be classified as a new type of 3-dimensional microrobot that enables miniaturization of top-down assembly systems to dimensions under 1 cm. Embodiments of the present microrobots incorporate a combination of miniature flexures and cables to drive its joints from high force MEMS actuators. Actuation can be accomplished via two banks of in-plane electrothermal actuators, one coupled through an out-of-plane compliant socket, and the other one coupled remotely via a 30 μm-diameter cable. The present disclosure includes details for decoupling the motion of the robot joints with an identified robot Jacobian, and offers experimental characterization of the repeatability a prototype of the present microrobots. Results show that the prototype robot is repeatable to under 0.5 μm along X and Y axes, and to 0.015 degrees along pitch and yaw degrees of freedom.

I. Overview and General Description

Figure 1B:
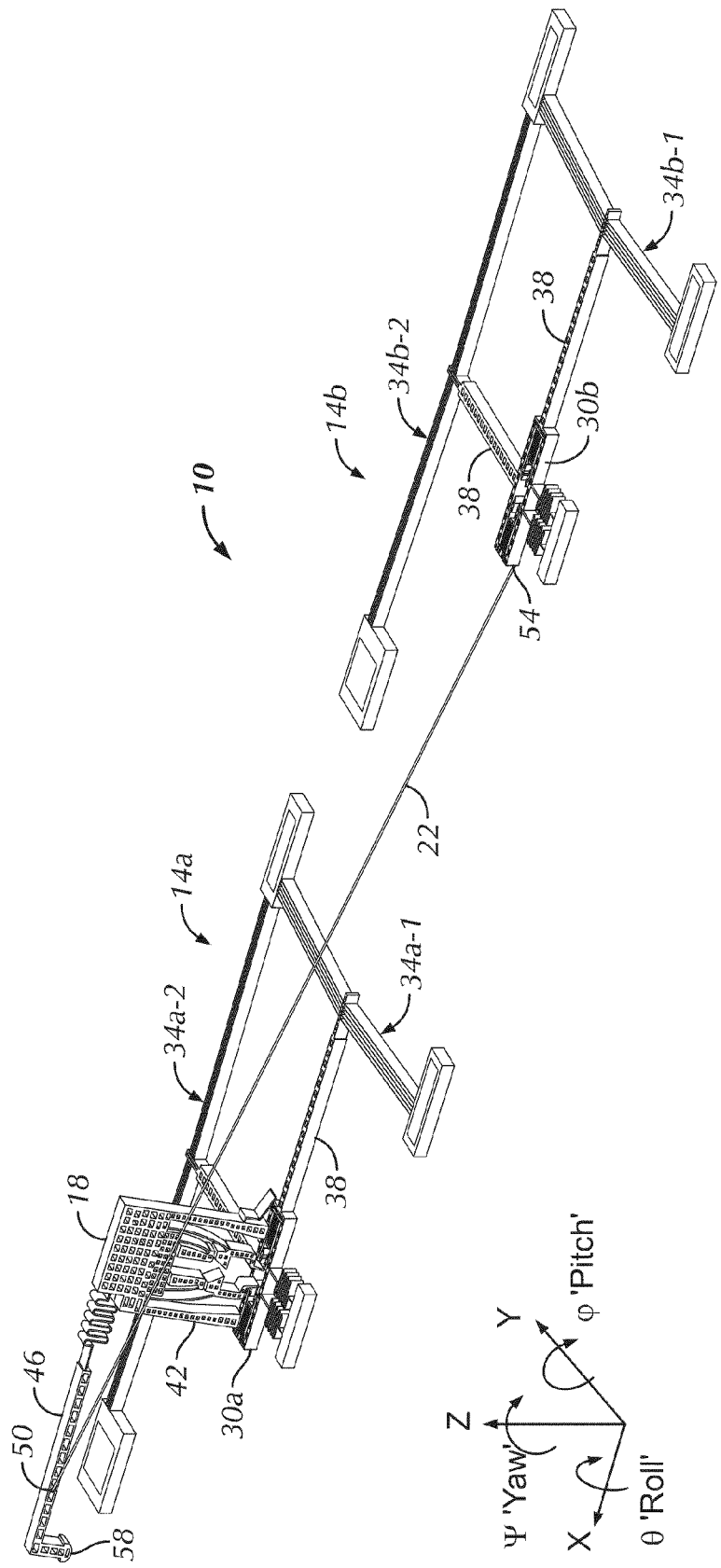
FIG. 1B depicts an isolated perspective view of the microrobot of FIG. 1.
Figure 1C:
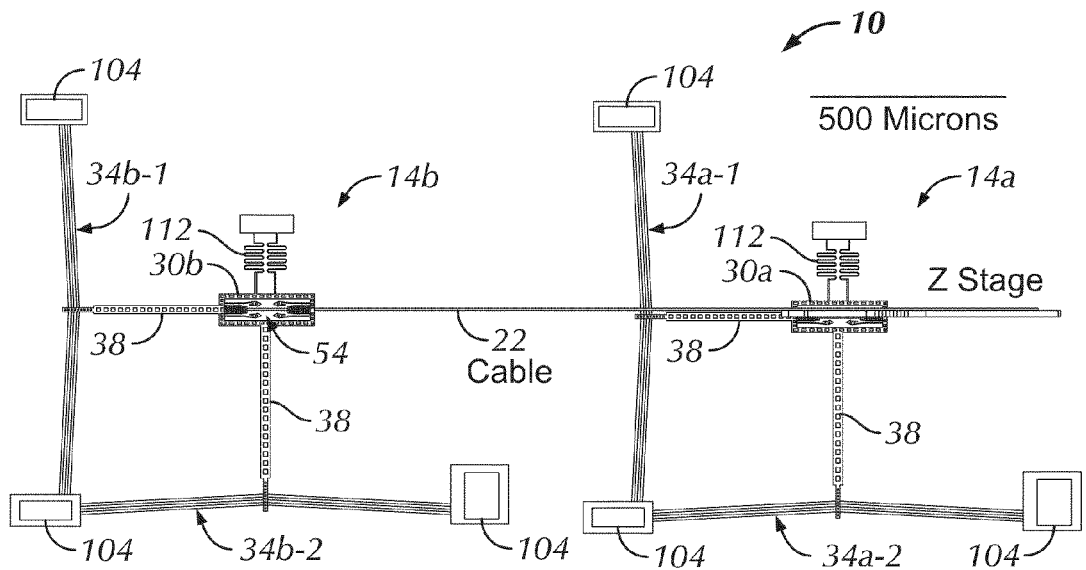
FIG. 1C depicts a top view of the microrobot of FIG. 1.

Referring now to the drawings, and more particularly to FIGS. 1A-1C, shown there and designated by the numeral 10 is one of the present microrobots. FIG. 1 depicts a photograph of a prototype the microrobot 10; FIG. 1B depicts an isolated (shown without substrate/die) perspective view of the microrobot 10; and FIG. 1C depicts a top view of the microrobot 10. Microrobot 10 may be interchangeably referred to in this disclosure as robot 10.

Robot 10 comprises two in-plane XY actuator drives 14a and 14b (14, collectively) (actuatable, or powerable/powered to move, in X and Y directions) that cooperate to control the robot's four degrees of freedom (DOFs); an arm 18; and a cable 22. As shown in FIG. 1, actuator drives 14 are supported by substrates 26a and 26b, as is described in more detail below. Actuator drives 14 are substantially similar, with the exception of differences noted below, and actuator drive 14a is described as representative of both actuator drives 14. Actuator drive 14a can be described as a first actuator drive, and has a first shuttle 30a and one or more (e.g., two, as shown) in-plane actuators 34a-1 and 34a-2 (34a, collectively) coupled to first shuttle 30a. In particular, actuators 34a are coupled to shuttle 30a by way of shuttle arms 38 that extend between shuttle 30a and a respective actuator 34a-1 or 34a-2, and, in the embodiment shown, shuttle arms 38, shuttle 30a, and actuators 34a, are of unitary construction (manufactured as a single piece). First actuator drive 14a is configured such that the one or more actuators 34 are actuatable (can be powered to drive, or are drivable) to move first shuttle 30a along a first plane (e.g., along the plane of substrate 26a). Second actuator drive 14b is substantially similar to first actuator drive 14a in that second actuator drive 14b has a second shuttle 30b and one or more (e.g., two, as shown) in-plane actuators 34c and 34d coupled to second shuttle 30b, and is configured such that actuators 34b-1 and 34b-2 (34b, collectively) are actuatable to move second shuttle 30b along a second plane (e.g., along the plane of substrate 26b). In some embodiments, one or both actuator drives 14a and/or 14b are configured such that their respective shuttles are physically constrained from moving other than along their respective planes of actuation by their respectively coupled actuators 34a or 34b. The primary difference between first actuator drive 14a and second actuator drive 14b is that first actuator shuttle 30a is configured to be coupled to arm 18 (e.g., via a micro-snap fastener, as described in more detail below), and second shuttle 30b is configured to be coupled to cable 22.

In the embodiment shown, the one or more in-plane actuators 34a of first actuator drive 14a comprise: a first actuator 34a-1 configured to be actuated along a first axis (e.g., either or both directions along an actuation axis that, here, is the longitudinal axis of shuttle arm 38 that couples actuator 34a-1 to shuttle 30a); and a second actuator 34a-2 configured to be actuated along a second axis (e.g., either or both directions along an actuation axis that, here, is the longitudinal axis of shuttle arm 38 that couples actuator 34a-2 to shuttle 30a) that is substantially perpendicular to the first axis. In other embodiments, the actuation axis of actuator 34a-1 need not be substantially perpendicular to the actuation axis of actuator 34a-2. In the embodiment shown, the one or more in-plane actuators 34b of second actuator drive 14b comprise: a third actuator 34b-1 configured to be actuated along a third axis (e.g., either or both directions along an actuation axis that, here, is the longitudinal axis of shuttle arm 38 that couples actuator 34b-1 to shuttle 30b) that, in the embodiment shown, is also substantially parallel to the first axis (actuation axis of actuator 34a-1); and a fourth actuator 34b-2 configured to be actuated along a fourth axis (e.g., either or both directions along an actuation axis that, here, is the longitudinal axis of shuttle arm 38 that couples actuator 34b-2 to shuttle 30b) that, in the embodiment shown, is also substantially parallel to the second axis (actuation axis of actuator 34a-1). As described below, in the embodiment shown, actuators 34a, 34b comprise electrothermal chevron actuators.

Arm 18 has a base portion 42 and a cantilever portion 46. Cantilever portion 46 is movably coupled to (e.g., by way of a flexure) and extending from base portion 42. Base portion 42 is coupled (e.g., in fixed relation) to first shuttle 30a of first actuator drive 14a. Cable 22 has a first end 50 coupled to second shuttle 30b of second actuator drive 14b and a second end 54 coupled to cantilever portion 46 of the arm. In the embodiment shown, cable 22 comprises a copper wire having a diameter between 20 μm and 40 μm, more particularly between 25 μm and more particularly substantially equal to 30 μm.

Robot 10 is configured such that first and second actuator drives 14a and 14b are actuatable (can be powered or driven) to: (i) translate base portion 42 of the arm along the first plane (e.g., in directions parallel to the first plane of first actuator drive 14a); and (ii) pivot cantilever portion 46 of the arm relative to base portion 42 of the arm. For example, when first actuator drive 14a is actuated to move first shuttle 30a, arm 18 is also moved. As another example, second actuator drive 14b can be actuated to pull cable in a direction away from arm 18, such that cantilever portion 46 of the arm is raised (e.g., rotated relative to base portion 42 of the arm). Further, in the embodiment shown, robot 10 is configured such that first and second actuator drives 14a and 14b are actuatable (can be powered on or driven) to: (i) translate the base portion of the arm in at least two directions along the first plane (e.g., in the actuation directions of each of actuators 34a); and (ii) pivot cantilever portion 46 of the arm relative to the base portion of the arm around at least two axes of rotation (e.g., up/down rotation relative to base portion 42 of the arm, and left/right rotation relative to base portion 42 of the arm).

In the embodiment shown, the maximum dimensions of robot 10 do not exceed 3.2 mm×2.2 mm×1.2 mm, and more particularly, do not exceed 3 mm×2 mm×1 mm. Further, cantilever portion 46 of arm 18 comprises an end effector 58, and the robot is configured such that actuator drives 14 are actuatable (can be powered on or driven) to move end effector 58 (e.g., via base portion 42, cantilever portion 46, cable 22, etc.) laterally (side-to-side in a direction perpendicular to base portion 42, perpendicular to cantilever portion 46, and parallel to the plane of substrate 26a) by at least 40 micrometers (μm), longitudinally (parallel to the longitudinal axis of cantilever portion 46) by at least 40 μm, and vertically by at least 50 μm, as described in more detail below. Additionally, robot 10 is configured such that actuator drives 14 can be powered or driven to cause end effector 58 to apply at least 40 milliNewtons (mN) of force to an object in a direction substantially parallel to the first plane; and/or such that actuator drives 14 can be powered or driven to cause end effector 58 to apply at least 20 mN of force to an object in a direction substantially perpendicular to the first plane (e.g., in a downward direction toward the plane of substrate 26a).

Figure 2:
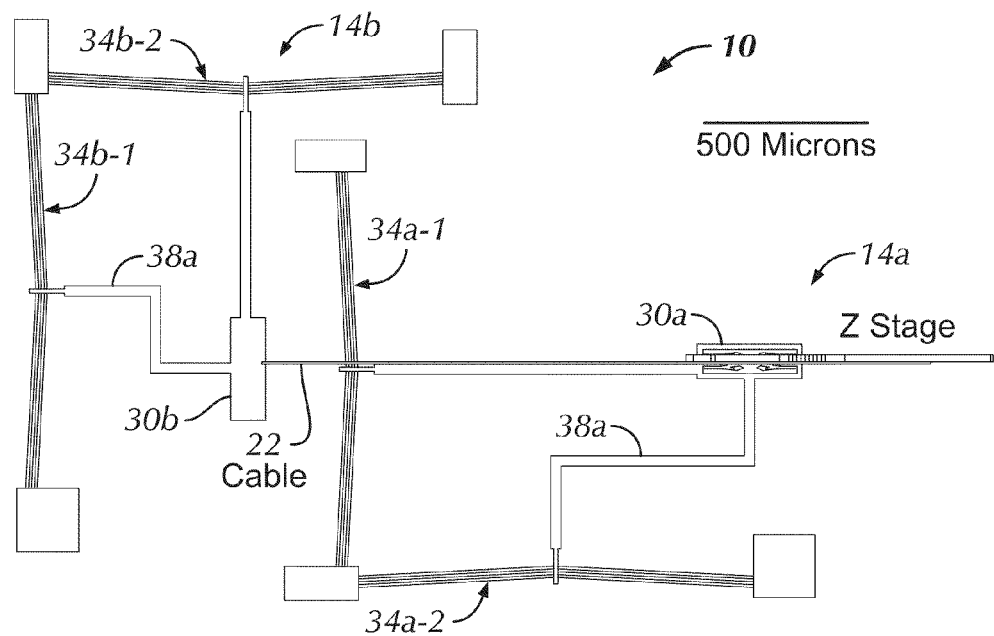
FIG. 2 depicts a top view of an alternate embodiment of one of the present microrobots.

FIG. 2 depicts a top view of an alternate embodiment of one of the present microrobots 10a. Robot 10a is substantially similar in operation to robot 10, with the primary exception that the actuator drives are condensed to reduce the overall dimensions of the robot. To this end, shuttle arms 38a are provided in place of two out of the four straight shuttle arms 38 of robot 10. As shown, shuttle arms 38a have a Z-shaped or zig-zag configuration that permits actuators 34 to be configured in a smaller area to reduce the overall dimensions of the robot.

Figure 3:
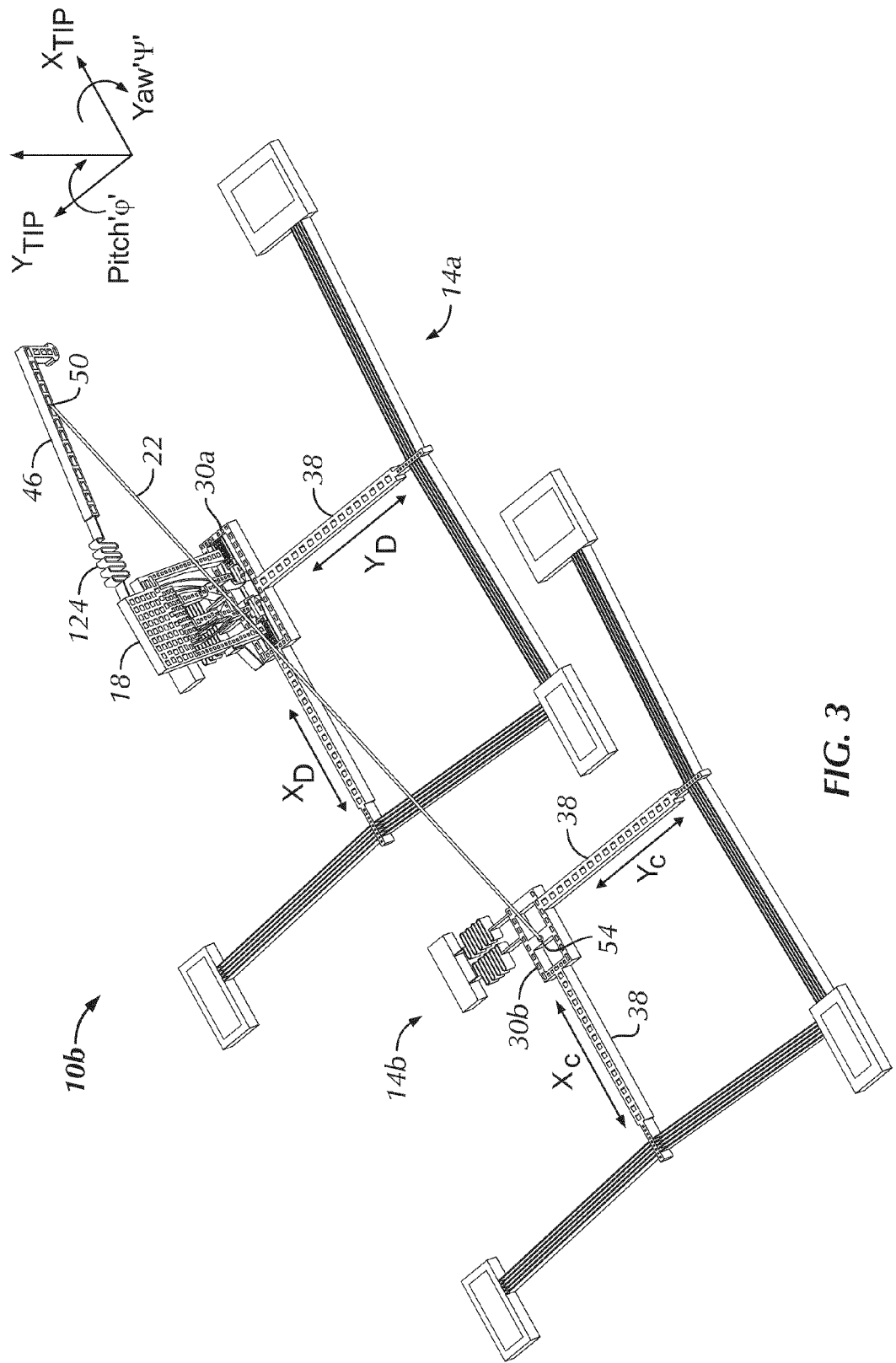
FIG. 3 depicts an isolated perspective view of an alternate embodiment of the present microrobots.

FIG. 3 depicts an alternate embodiment 10b of the present microrobots. Robot 10b is substantially similar in function to the prototyped robot 10 of FIGS. 1A-1C, and, as such, the function of robots 10 and 10b are both described with reference to the coordinate system depicted in FIG. 3 (which also describes the function of robot 10a). The only difference between robot 10b of FIG. 3 and robot 10 of FIGS. 1A-1C is that the two XY stages (actuator drives) are moved closer together, as shown.

Figure 4:
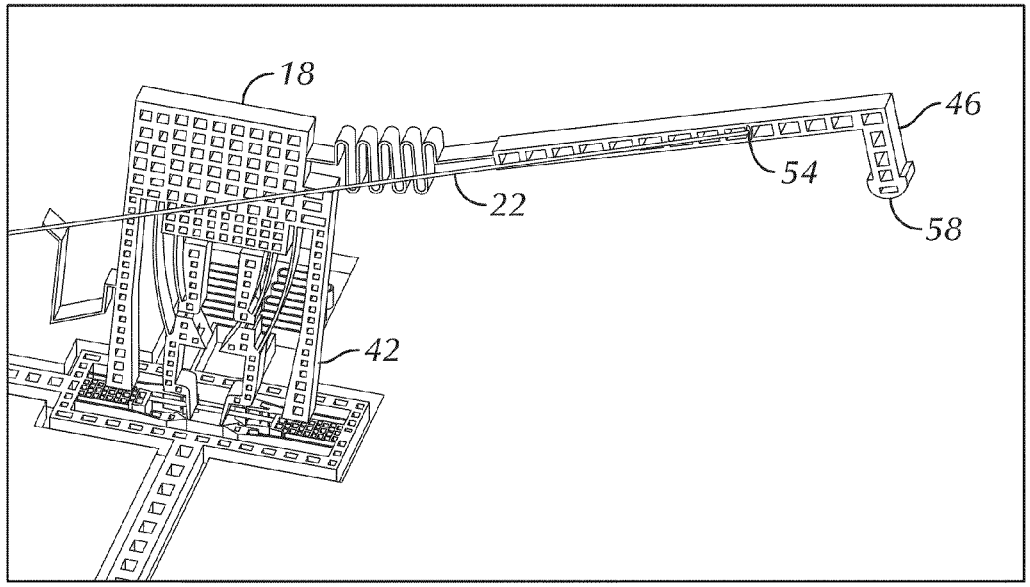
FIG. 4 depicts a picture of the vertical arm of the microrobot of FIG. 1.

FIG. 4 depicts an enlarged picture of arm 18 and cable 22 of robot 10. The tip of end effector 58 can be referenced as a tool coordinate point (TCP), and movement of the TCP can be obtained and/or described via two prismatic ($X_{TIP}$, $Y_{IP}$) and two revolute ($\phi_{pitch}$, $\psi_{yaw}$) motions or degrees of freedom (DOFs). In the prototype evaluated in this disclosure (depicted in FIG. 1), the robot comprises a first actuator drive 14a and a second actuator drive 14b. In the prototype of this disclosure, the actuator drives 14a and 14b are substantially identical, with the exception of differences in their respective shuttles 30a and 30b. More particularly, shuttle 30a couples to vertically assembled (extending vertically from the plane of substrate 26a) arm 22 (which, in the embodiment shown, is 800 μm tall). The second XY actuator drive 14b is coupled to cable 22 (which, in the embodiment shown, has a 30 μm diameter and a length of 3.2 mm) that is that is bonded to the cantilever portion (flexure arm) on the other end. The actuators 34a and 34b comprise electrothermal chevron prismatic actuators. Four independent pose (or position) parameters of the TCP can be achieved through a combination of planar motions by the actuators 34a and 34b. The first actuator pair 34a-1 and 34a-2 drives the first shuttle 30a (and the base portion 42 of arm 18) along axes denoted by $X_D$ and $Y_D$, where the subscript 'D' represents direct coupling to the base portion 46 of arm 18. The second actuator pair 34b-1 and 34b-2 drives or controls the cantilever portion 46 of arm 18 via second shuttle 30b and cable 22, along axes denoted by $X_C$ and $Y_C$. A summary of a typical actuation sequence for the robot and the resulting motion at the TCP is outlined in Table 1. Pure translational motion along $X_{TIP}$ and $Y_{TIP}$ requires that both $X_C$ and $X_D$ or $Y_C$ and $Y_D$ be actuated by the same displacement. Vertical motion of the TCP is a result of the pitch motion of the arm through the cable when $X_C$ and $X_D$ are not actuated by the same displacement.

TABLE 1

Actuator to joint relation

| Actuator powered | Joints Actuated (including coupling) |
|---|---|
| $X_D$ | Mostly Pitch($\phi$), Some Yaw ($\psi$) |
| $X_C, X_D$ | Mostly X, Some Y |
| $Y_D$ | Mostly Yaw ($\psi$), Some Pitch($\phi$), |
| $Y_C, Y_D$ | Mostly Y, Some X |
| $X_C, X_D, Y_C, Y_D$ | X, Y |
| $X_D, Y_D$ | Pitch($\phi$), Yaw ($\psi$) |

Embodiments of the present robots (e.g., 10, 10a, 10b) can have a number of characteristics and advantages not found in prior MEMS robots and devices. For example, all primary components except wire 22 (e.g., actuator drives 14, arm 18) can be fabricated using deep-reactive-ion-etching (DRIE) on 50~100 microns (device) SOI. After etching, arm 18 can be de-tethered and assembled out-of-plane (out of the plane of substrate 26a) using, for example, a passive jammer. Additionally, even smaller sizes can be achieved (e.g., size can be reduced by up to a factor of ten) using the same types of construction and technology, such that an array of microrobots 10 can be fabricated on a wafer in a scalable way. In this way, for example, robots 10 can be used in an array configurations inside a scanning electron microscope (SEM) for probing, handling an array of probes and nano-manipulation. As described in more detail, robot 10 is also configured for nanometer-scale resolution and repeatability, and is suitable for high-precision applications such as nano-probing, nano-positioning.

In one example, multiple (e.g., numerous, such as hundreds of) robots 10 can be packed in an array on the surface of the wafer to create a nanoprober array. The probers in the array can be controlled independently along all degrees of freedom (X, Y, and Z). Current technology for such arrays are used in the IBM Millipede as high density data storage tips, but they cannot be independently moved in X, Y, and Z. The present robots 10 can be configured as probers to replace the IBM Millipede cantilever tips, and/or the mechanism for moving/replacing the data storage surface when it gets permanently damaged after repeated use, to permit the flexibility of controlled X, Y, and Z motion.

II. Fabrication and Assembly

One feature of the present microrobots is that all actuators can be placed in-plane. This allows for adopting standard lithographic microfabrication processes, and the vertical interconnections can be accomplished by 3D microassembly. Deep reactive ion etching (DRIE) on silicon on insulator (SOI) substrates with a 100 μm thick device layer was used to fabricate links, joints and actuators of robot 10, with the exception of cable 22. The aspect ratio of the components in the prototype is, at most, 1:20, and all parts except for the cable can be described as having 2½D geometries, as such description is currently understood in the art.

Actuator drives 14a and 14b, and arm 18, were lithographically manufactured using DRIE on a SOI substrate. The Z-arm of the actuator is fabricated in-plane with a tether remaining to the substrate, and is released by breaking the tether with a passive "jammer." Arm 18 is then picked up from the substrate, rotated by 90 degrees, and vertically assembled (coupled to shuttle 30a) by means of a compliant snap-fastener, resulting in a vertically oriented (relative to shuttle 30a and substrate 26a), as shown in FIG. 4. The design of the vertical snap-fastener is similar to connectors extensively described in prior publications of the inventors. The microassembly operation is automated using the $\mu^3$ system located at UT Arlington's Texas Microfactory. More information on the snap-fastener design and assembly methodology can be found in [16-17]. Once assembled, the joint strength of the Z-arm (strength of the connection between arm 18 and shuttle 30a) can be increased using UV-curable epoxy dispensed at the joint between the arm and shuttle 30a. The joint strength of similar joints before failure has been evaluated extensively in the past [18], and has generally exceeded 50 mN when loaded in the weaker Y direction. Once bonded, the stiffness of this joint is generally much larger than the remaining flexures and/or joints of the robot, and can largely be described as and considered "rigid". Prior to assembly, the robot die can be placed in a micropackage and the actuators driven by current inputs directed to the Au-coated pads via wirebonds. Currently, the footprint and dimensional choices for some of the robot components may not be optimum for all applications, and can be varied in any suitable fashion to adapt the configuration of the robot as suitable or desired.

III. Configuration of Actuator Drives, Arm, and Cable

A. Methodology of Design and Configuration

Figure 5:
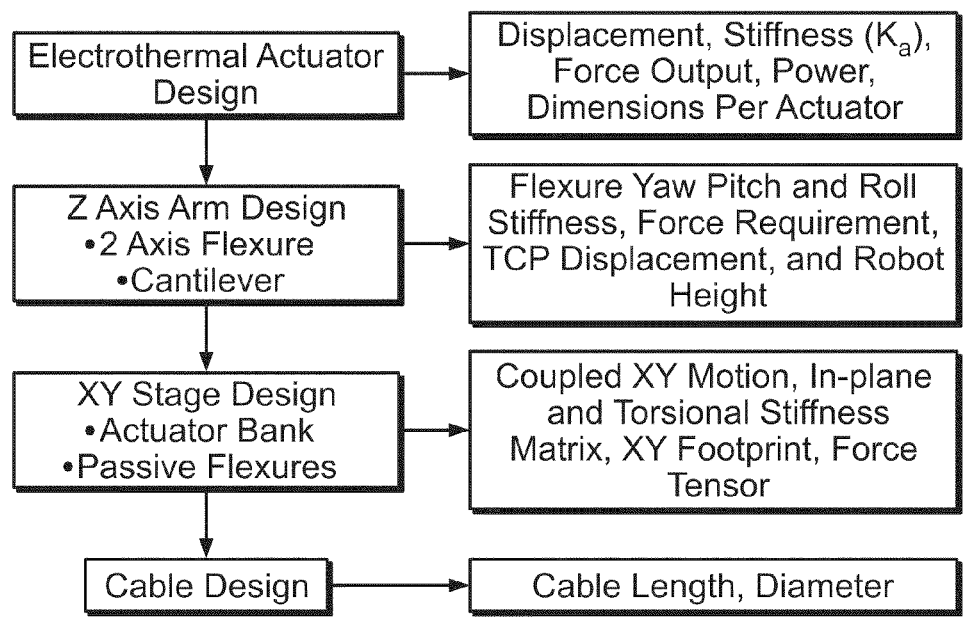
FIG. 5 depicts a flowchart of one of the present methods of selecting design parameters for embodiments of the present microrobots.

FIG. 5 depicts a flowchart outlining the design steps for the prototyped version of microrobot 10. A 3D (e.g., cubic) workspace requirement of 50 μm along all the X, Y, and Z axes was targeted. A chevron beam electrothermal actuator (actuators 34a and 34b) was designed to produce a required planar deflections, while maintaining its torsional stiffness. XY flexure stages (actuator drives) 14a and 14b were incorporated into the design, and a Z-axis flexure was incorporated into the vertical arm 18 (between base portion 42 and cantilever portion 46) based on the desired TCP displacement and the planar actuation inputs (displacement) from Actuator drives (XY stages) 14a and 14b. Actuator drives (XY stages) 14a and 14b were designed to provide enough support and stiffness to allow controlled displacements for the Z axis arm, including sufficient stiffness against reaction torque due to the vertical arm pitch and yaw motion. Finally, the length, diameter, angle to Z-arm 18, and attachment location along the cantilever portion 46, for cable 22 were selected in order to maximize transmission of the force generated by actuator drives 14a and 14b. In practice, this sequence may be iterated multiple times to suit a specific force or displacement requirement at the tool tip.

B. In-Plane Actuator Drive Configuration

Actuator drives 14a and 14b (driving the microrobot) were designed to: (i) allow a large displacement of their respective shuttles 30a and 30b in the plane of their respective substrates 26a and 26b (e.g., SOI dies); (ii) resist out-of-plane bending torques when the pitch and yaw axes (motions) of cantilever portion 46 are actuated; and (iii) maximize the retention force of the assembled out of plane arm 18 in the snap-fastener socket of shuttle 30a.

Figure 6A:
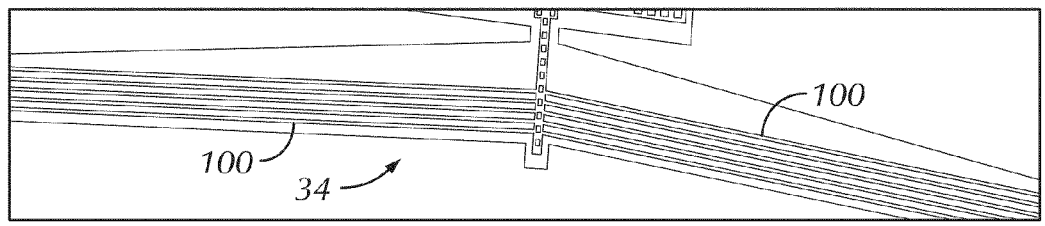
FIG. 6A depicts a picture of a chevron actuator suitable for use in embodiments of the present microrobots.
Figure 6B:
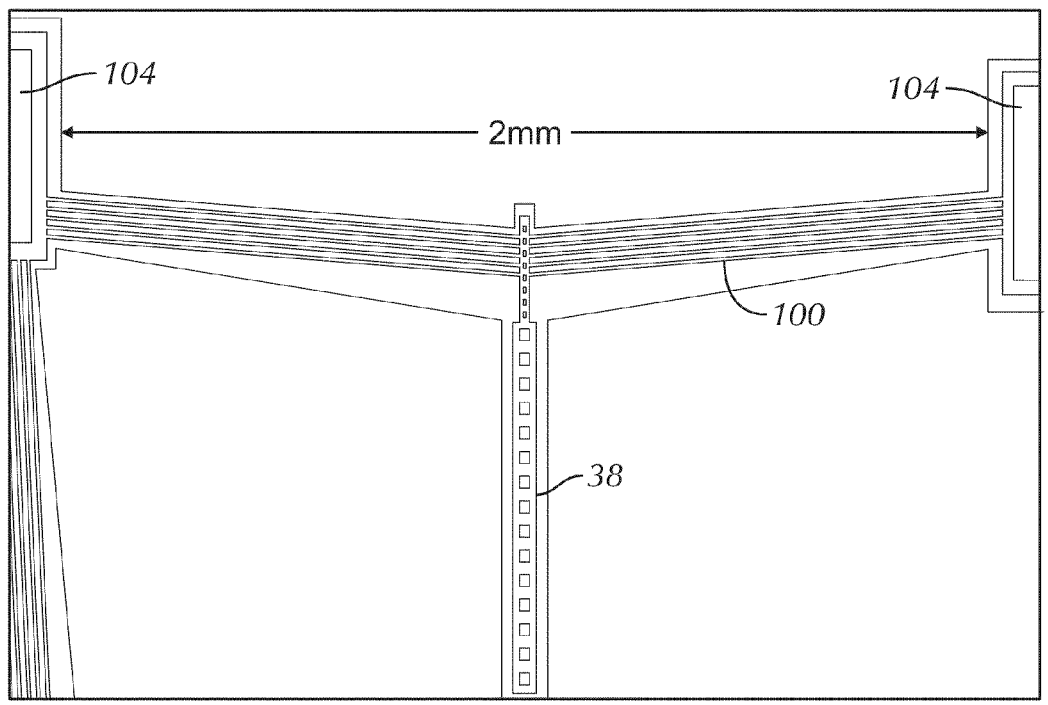
FIG. 6B depicts a top view of a chevron actuator suitable for use in embodiments of the present microrobots.

FIGS. 6A and 6B depict perspective and top views, respectively, of an electrothermal chevron actuator 34 suitable for use in, and used in the prototype of, robot 10. Because the actuator portion of actuators 34a and 34b are substantially similar in design and construction, electrothermal actuator 34 of FIGS. 6A and 6B is described as representative of all actuators 34a and 34b. Actuator 34 is designed for a horizontal displacement of up to 50 μm. Actuator 34, as shown, comprises seven pairs of 15 μm-wide, 1 mm-long, and 100 μm-thick beams 100. Beams 100 are each offset or separated from one another by a distance of 10 μm, and form an angle of 3.5° to shuttle arm 38 that couples the respective actuator (34a-1, 34a-2, 34b-1, 34b-2) to the respective shuttle (30a, 30b). Actuator 34 exhibit a current draw of approximately 50 mA at 10 V (e.g., alternating current or AC) input with 18 μm steady-state displacements, and 250 mA at 19 V input with 48 μm displacements, with a stiffness of about 180N/m. The measured bandwidth of actuator 34 was 45 Hz, and is generally dictated by thermal effects (rather than mechanical resonance). Actuator 34 produces up to 50 mN of force output at maximum voltage inputs (e.g., 19-20 V). Power is provided to actuator 34 by way of pads 104, which can, for example, be coated with gold (Au) to improve conductivity of connection to conductors such as wires and the like.

Figure 7A:
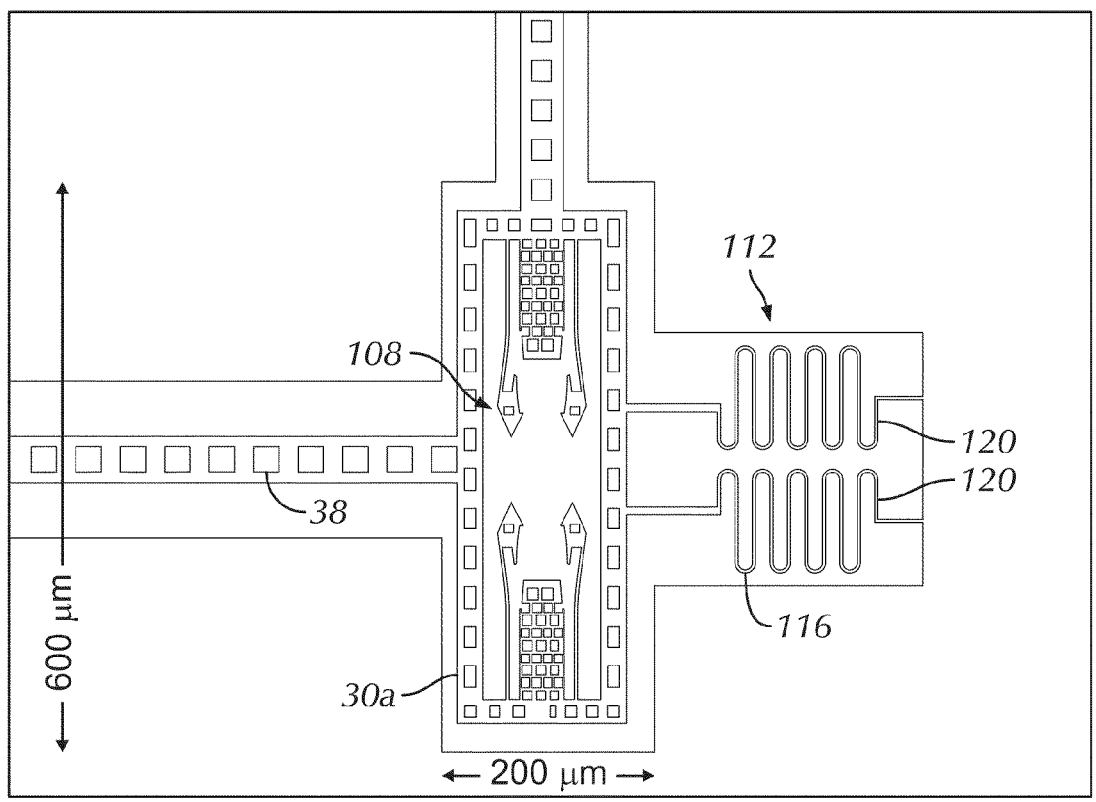
FIG. 7A depicts a micro-snap fastener joint of the microrobot of FIG. 1.

FIG. 7A depicts an embodiment of shuttle 30a that is suitable for use in embodiments of (and is used in the prototype of) robot 10. As mentioned above, shuttles 30a and 30b are substantially similar, with the exception that shuttle 30a is configured (e.g., by way of a micro-snap fastener 108) to be coupled to base portion 46 of arm 18. As such, shuttle 30a is described as representative of first and second shuttles 30a and 30b, with the understanding that, when used as second shuttle 30b, micro-snap fastener 108 can be (and was, in the prototype) omitted. At the center of the shuttle 30a is micro snap-fastener 108, configured to receive an out-of-plane (e.g., vertical) assembly of Z axis arm 18, such as is depicted in FIGS. 1, 2, and 4.

Shuttle 30a has a rectangular shape with four sides. As shown, shuttle 30a is coupled on two sides to (and, in the prototyped embodiment, is integral to or of unitary construction with) shuttle arms 38, which also provide some support to shuttle 30a (e.g., during operation of the actuator drive 14a. In the embodiment shown, shuttle 30a is also coupled to (and, in the prototyped embodiment, is integral to or of unitary construction with) a passive flexure (e.g., flexure spring) 112. Flexure 112, in prototyped embodiment shown, is also integral to the substrate (e.g., SOI die) 26a. Flexure 112 adds to the torsional stiffness of shuttle 30a (e.g, reduces twisting of shuttle 30a during operation of actuator drive 14a), and increases durability of actuator drive 14a (e.g., allows a larger number of cycling operations before failure). Flexure 112 can be designed and/or configured for varying numbers, n, of turns 116; width of each coil, w; and number of flexure elements 120, N, for each flexure 112. The embodiment of shuttle 30a shown in FIG. 7A depicts the configuration of shuttle 30a in the prototyped embodiment of FIG. 1. More particularly, and as shown, shuttle 30a is configured with a length of about 600 μm and width of about 200 μm; and flexure 112 is configured with two flexure elements 120, each with n=9 turns, w=about 100 μm, and N=2 flexure elements 120.

Figure 7B:
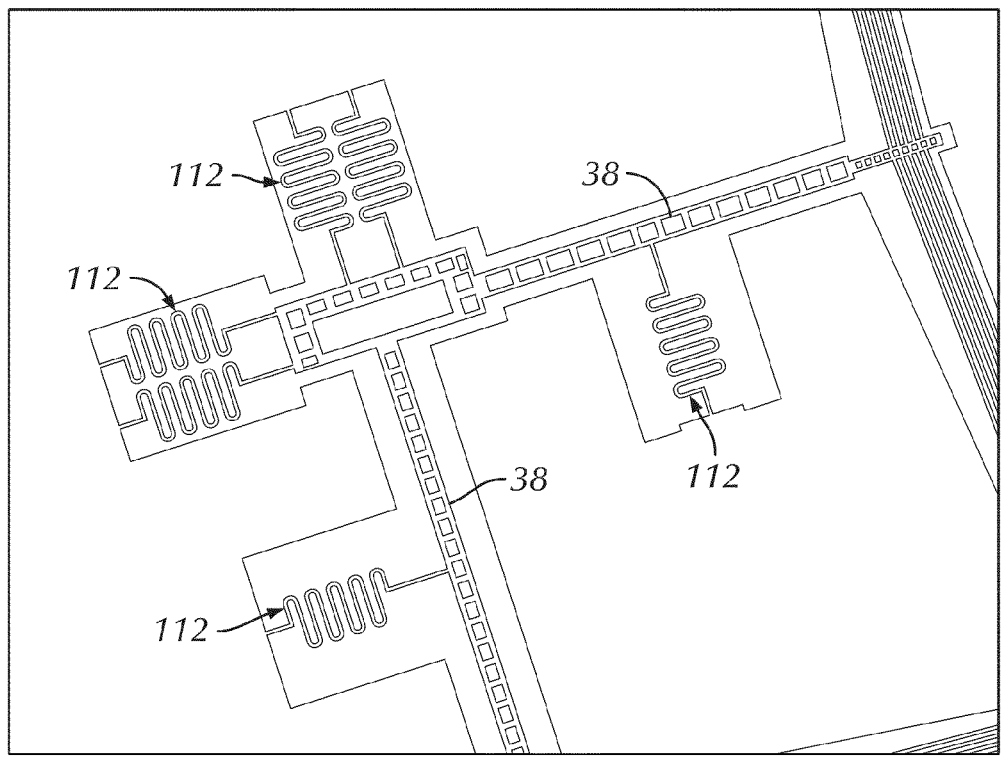
FIG. 7B depicts another joint suitable for use in embodiments of the present microrobots.

FIG. 7B depicts a shuttle 30c that is an alternate embodiment of shuttle 30a. Shuttle 30c includes four flexures 112, two each of two different configurations. The configuration shown in this figure results in relatively low deflection (24 microns) and relatively high torsional rigidity (0.5 N-m²/rad) compared to the configuration shown in FIG. 7A. Shuttle 30c corresponds to FIG. 8C.

Actuator drive 14a (including drive 14a and flexure 112 of FIG. 7A, and actuators 34a of FIGS. 6A-6B) was optimized and/or configured to maximize possible displacement of shuttle 30a while maintaining suitable torsional stiffness (e.g., during pitch and yaw actuation and/or motion of cantilever portion 46 of arm 18) along the pitch, yaw, and roll axes of shuttle 30a, using finite element analysis (FEA) modeling.

FIGS. 8A-8D show plots of XY displacement and stiffness along the pitch direction for different iterations of the designs of actuator drives (e.g., 14a, 14b). FIGS. 8A-8C were generated from the FEA modeling of different iterations. FIG. 8D was generated from experimental testing of the prototype. FIG. 8A shows the displacement for n=8, w=10 μm and N=2, which yielded relatively high displacement (45 microns) with relatively low torsional rigidity (0.26 N-m²/rad). FIG. 8B shows displacement for n=6, w=10 μm and N=4, which yielded medium deflection (40 microns) and medium torsional rigidity (0.38 N-m²/rad). FIG. 8C is displacement profile for n=4, w=10 μm and N=2, which yielded relatively low deflection (24 microns) and relatively high torsional rigidity (0.5 N-m²/rad). Ideally, the motion of the shuttle should be planar, along two DOFs (X and Y), and each actuator 34 should directly control its own DOF (X or Y). However, due to the fact that the two actuators 34 are both connected to the shuttle, XY motion of the shuttle is coupled, and some amount of undesirable drift generally occurs along the axis orthogonal to the actuation axis of each actuator. The size of the shuttle arms (e.g., 38), and the stiffness of the flexures can be (and were, for the prototype) selected to be close to decoupling the XY motion of the shuttle, and then experimentally evaluated using a microscope. FIG. 8D depicts the experimentally measured characteristics of the configuration of FIG. 8B, n=6, w=10 μm and N=4. For the prototyped embodiment, the torsional rigidity was 0.26 N-m²/rad along the pitch and roll axes and 0.12 N-m²/rad along the yaw axes (FIG. 1B depicts the pitch, yaw, and roll axes relative to the X and Y axes). Coupling compensation using kinematic identification of the microrobot X, Y, and Z stages was carried out experimentally after fabrication and assembly, as described below. This was accomplished by providing a wide range of voltage inputs to the actuators 34a-1, 34a-2, 34b-1, and 34b-2, and tracking the resulting position of end effector 58 for each input. The resulting input output data was used to fit an approximate model, the inverse of which provides the inputs required for a desired trajectory for end effector 58.

C. Z-Axis Arm Configuration

Figure 9A:
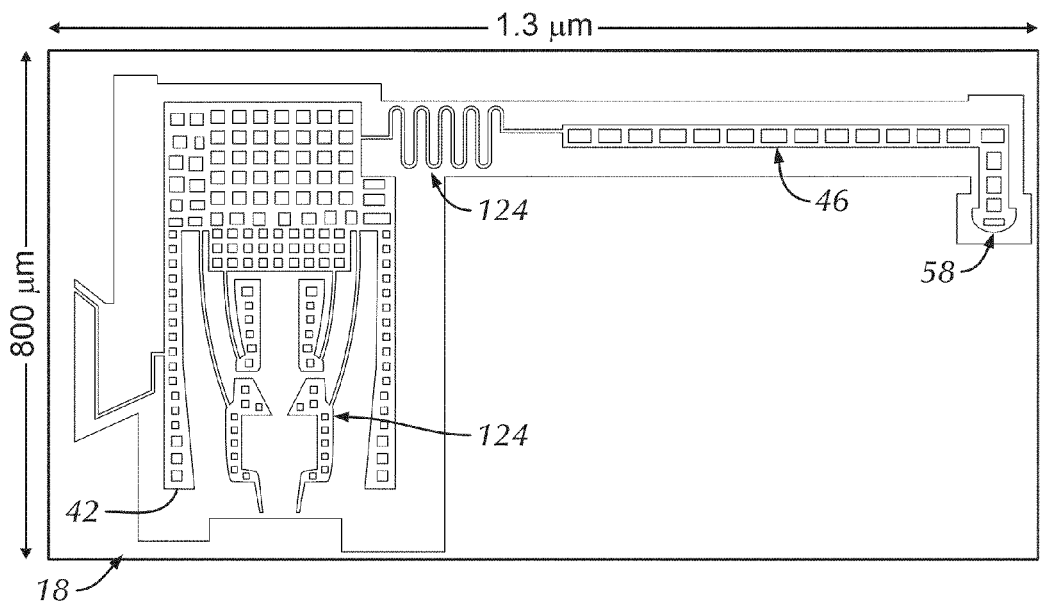
FIG. 9A depicts a side view of a vertical arm suitable for use in embodiments of the present microrobots.
Figure 9B:
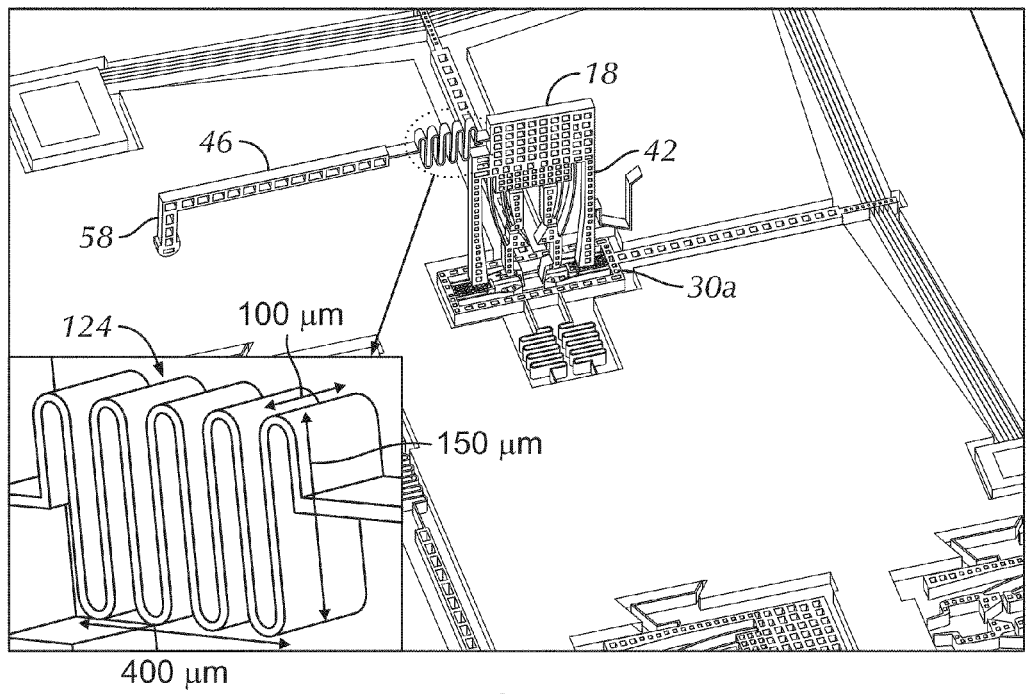
FIG. 9B depicts a picture of the vertical arm of the microrobot of FIG. 1.
Figure 9C:
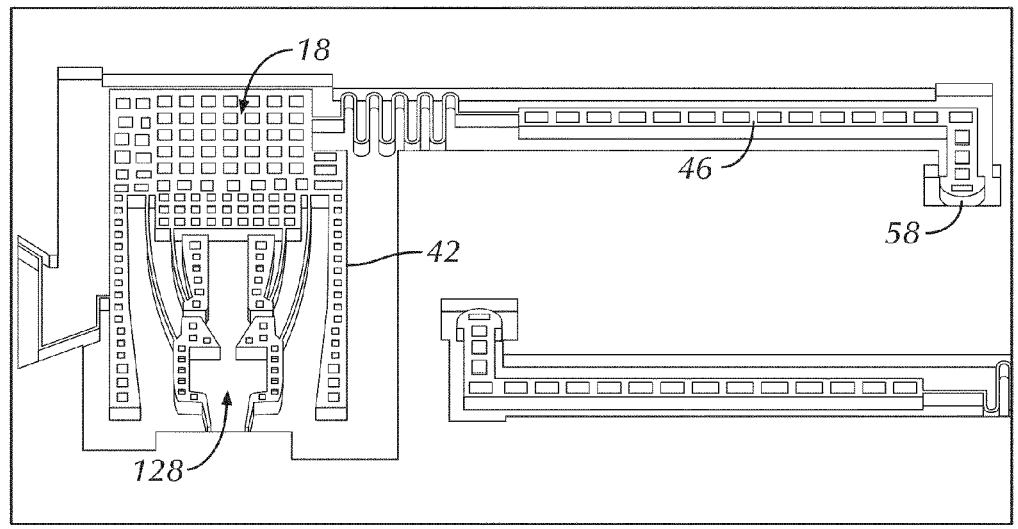
FIG. 9C depicts a picture of a vertical arm manufactured for use in embodiments of the present microrobots.

Referring now to FIGS. 9A-9C, FIGS. 9A, 9B depict side and perspective views, respectively, of arm 18; and FIG. 9C depicts a side view of a prototyped arm 18. As noted above, arm 18 comprises base portion 42 and cantilever portion 46. As shown in more detail in FIGS. 9A and 9B, arm 18 further comprises a flexure 124 and a compliant region 128. Compliant region 128 is configured to enable pick-up and assembly for coupling arm 18 to micro-snap fastener 108 of shuttle 30a. More particularly, the lower end of base portion 42 includes a pair of flexures with a micro-snap fastener configuration that is used for assembly onto (coupling to) micro-snap fastener 108 of shuttle 30a. Base portion 42 also includes a compliant region used for gripping the part for pickup with a "jammer" during assembly, and a guide to release the gripper after mating with the snap-fasteners. Details of some examples of suitable micro-snap fasteners can be found in U.S. Pat. No. 6,672,795, which is incorporated by reference in its entirety. Additional fastener examples and further information on design of this region can be found in [19].

Flexure 124 was optimized and/or configured using FEA modeling to maximize the force output at the tool coordinate point (end effector 58). In the embodiment shown, flexure 124 is a two-axis flexure (e.g., it permits rotation of cantilever portion 46 relative to base portion 42 around at least two axes, such as, for example, up/down relative to base portion 46, left/right relative to base portion 42). Further, in the embodiment shown, cantilever portion 46, base portion 42, and flexure 124 of arm 18 are of unitary construction (are formed as a single piece from an SOI die). As indicated in FIG. 9A, arm 18 has a height of about 800 µm and flexure 124 has a length such that the overall dimension of base portion 42 and cantilever portion 46 is about 1.3 mm combined (the length of the cantilever portion 46 of the arm is about 800 µm). As indicated in the inset of FIG. 9B, flexure 124 of arm 18 is formed with a depth of about 100 µm, a length of about 400 µm, and a height or width of about 150 µm, with n=9 turns, and a stiffness of about 90 N/m along the pitch $\phi$ axis and about 140 N/m on the yaw $\psi$ axis.

D. Cable Angle Configuration

In the prototyped embodiment, cable 22 comprises copper (Cu) with a diameter of about 30 µm. In other embodiments, cable 22 can comprise carbon nanotubes, nanowires, and the like. First end 50 of cable 22 is coupled to cantilever portion 46 of the arm, and second end 54 of cable 22 is coupled to second shuttle 30b, such that forces and motion can be transferred from shuttle 30b to end effector 58 of cantilever portion 46. The attachment angle and location of coupling to cantilever portion 46 were simulated and optimized using FEA modeling.

Figure 10:
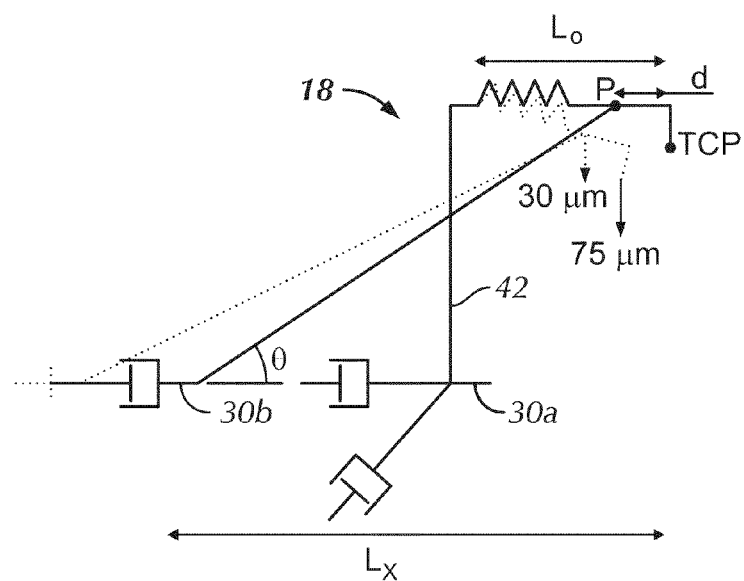
FIG. 10 depicts a diagram of a vertical arm of the present microrobots and a cable.
Figure 11:
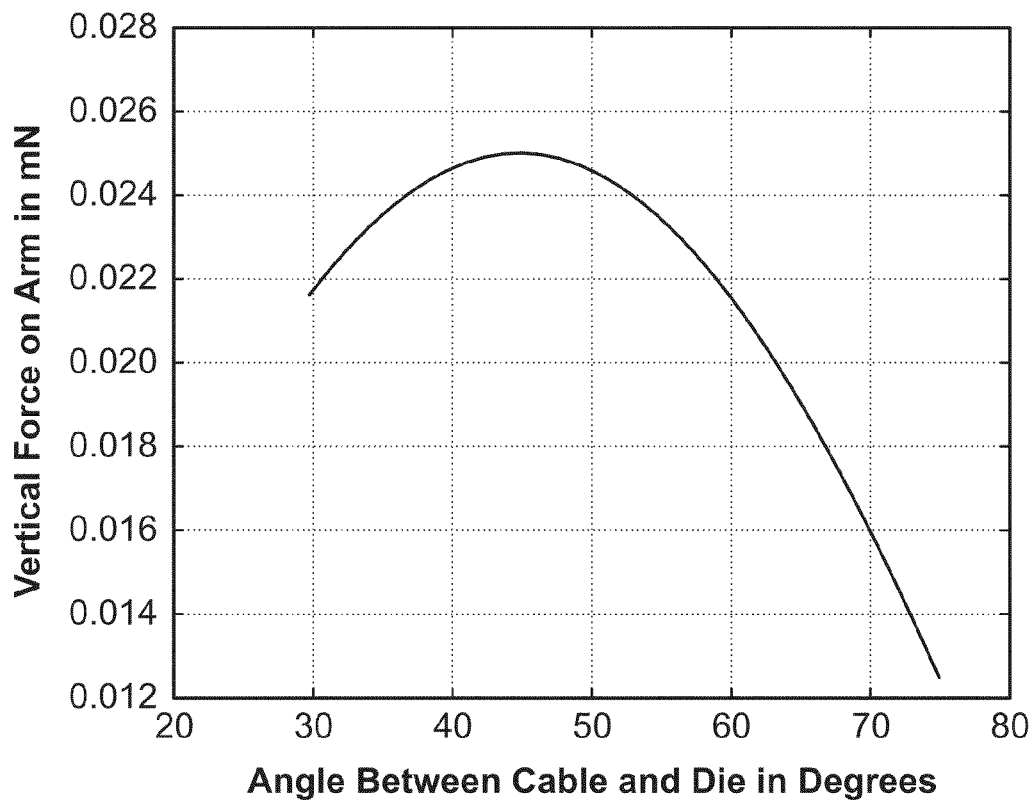
FIG. 11 depicts a chart of force transmission along a Y axis on a cantilever of the vertical arm for various angles of cable connection to the cantilever arm.

As shown in FIG. 10, the length of cable 22 and the point-of-attachment of cable 22 to cantilever portion 46 constrain the angle at which forces are transmitted through cable 22 to cantilever portion 46 (and to end effector 58). The deflection produced at the cable attachment point P is amplified at the TCP by a factor of $L_o/d$, while the output force is reduced by the same factor. Thus a smaller d (distance between point of attachment, P, and end of cantilever portion 46 adjacent to TCP) is desired to obtain higher TCP displacement outputs, while a larger d is desired for higher force outputs. Considering the flexure design discussed above, and the output force capacity from in-plane actuator actuator drive 14b, a parametric FEA analysis on the Z axis arm was conducted to determined: optimum cable angle θ, the distance d from the end of the arm, and the cable length that results in maximum force output at the point P along the $-Y_p$ axis. This also ensures maximum deflection of cantilever portion 46 with the TCP shown in FIG. 10. FIG. 11 illustrates the variation in force transmitted for various cable angles θ at which the cable is attached to second shuttle 30b. Maximum force is transmitted when this angle is 45 degrees. At this angle (45°), cable 22 must be attached at a distance d=200 µm from the tip of cantilever portion 46 for maximum force and displacement transmission. After determining the cable angle and d, the optimum cable length $L_c$ was determined using Equation (1).

$$L_c=(L_x-d)/\cos\theta, \qquad (1)$$

where $L_x$ is the distance between the center of second shuttle 30b (which drives the cable) and the tip of cantilever portion 46 projected onto the plane of the die, for d=200 µm and θ=45°. Using Equation (1), it was determined that $L_c$=3.2 mm.

E. Alternate Embodiments

The prototyped embodiment comprises two in-plane actuator drives 14a and 14b. Other embodiments of the present robots can comprise any suitable number of in-plane actuator drives. For example, some embodiments of the present robots can comprise three actuator drives with two as in the prototyped embodiment, and a third actuator drive positioned to the side of the arm such that an additional cable is at a greater angle (e.g., up to 90 degrees), relative to the side of the cantilever portion of the arm, to increase the forces in lateral directions that can be imposed or created at the end effector of the arm. In other embodiments, the cantilever portion of the arm can be provided with a telescoping configuration, and an additional in-plane actuator or actuator drive can be provided to increase or decrease the length of the cantilever portion of the arm. In other embodiments, robots can comprise any combination of in-plane actuator drives to provide translations, rotations, and/or combinations thereof, of the arm, cantilever portion of the arm, and/or the end effector of the arm. In other embodiments, actuators and/or actuator drives can be formed in the plane of the arm (e.g., an actuator in the plane of the arm can be coupled by a cable to the cantilever portion of the arm to provide pitch motion of the cantilever portion relative to the base portion). In another example, an actuator in the plane of the arm can provide actuation to telescope the cantilever portion of the arm.

IV. Experimental Results

A. Cable Attachment

Figure 12:
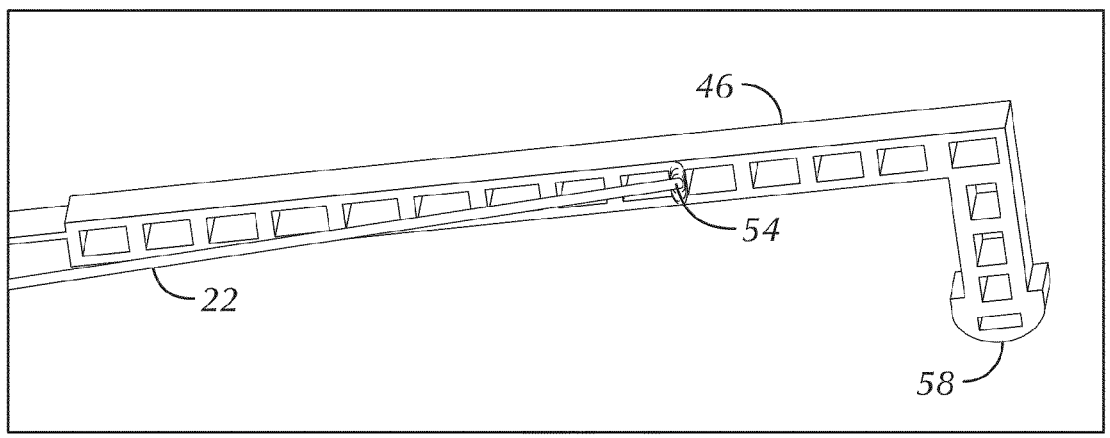
FIG. 12 depicts a picture of the connection of a cable to the cantilever of the vertical arm of the present microrobots of FIG. 1.

The cable used in constructing the prototype of microrobot 10 was a 30 µm diameter copper wire with a PVC coating. The coating provided some added strength, and cable 22 behaved more like a tight rod than a flexible tether. The cable was sliced to a length of 3.2 mm using an EXCIMER 248 nm laser. The cable was gripped using a Femto Tools® FT100 electrostatic microgripper mounted on a terminal roll degree of freedom of one of the robots in the $\mu^3$ system referenced above. Using machine vision through a microscope, cable 22 was oriented at approximately 45 degrees relative to the SOI die substrate 26b (and thereby to shuttle 30b), and ends 50 and 54 of the cable were epoxy bonded to cantilever portion 46 of the arm and second shuttle 30b of actuator drive 14b, respectively. The connection of cable 22 to cantilever portion 46 is shown in an enlarged view in FIG. 12.

B. Workspace Measurement

Post assembly, the microrobot work volume, which is the volume in 3D space reached by the TCP, was determined. When all four actuators 34a-1, 34a-2, 34b-1, and 34b-2 were sequentially swept from their respective zero positions to their respective maximum-displacement positions, the TCP passed through the 3D shape shown in FIG. 13. Using two high zoom (10× and 4.5×) cameras (one mounted directly above the TCP looking down at the TCP, and one mounted to the side looking directly at the side of cantilever portion 46), the locations reached by the TCP were recorded. As shown in FIG. 13, the workspace volume is not a parallelepiped, but shows a reduction in the achievable vertical displacements towards the end of the maximum horizontal displacement (along the X axes). The discrete points in FIG. 13 mark actual positions reached by the TCP.

C. System Jacobian

FIGS. 14A-14D depict sample snap-shots (pictures) of the TCP during various stages of actuation. FIGS. 14A and 14B show side view when $X_D$ (actuator 34b-1) was actuated.

FIGS. 14C and 14D show top views when $Y_C$ (actuator 34b-2) was actuated. As noted above, the four degrees of freedom of microrobot 10 are highly coupled and it was desirable to establish the kinematics that relate inputs at the actuator level (at actuators 34a and 34b) to the corresponding output motion of the TCP. The data used to determine the work volume was also used to approximate the microrobot Jacobian. To characterize the motion of the TCP, the four actuators (34a-1, 34a-2, 34b-1, 34b-2) were powered using various voltages. The two high-magnification microscopes (10× and 4.5×) were used to track the output motion of the features noted in FIG. 14. The top view camera was used to measure Y and yaw of the TCP (end effector 58 of cantilever portion 46), and the side view camera measures X and pitch of the TCP. The data recorded is shown in Table 2. The coordinates referenced correspond to the coordinates illustrated in FIG. 3.

TABLE 2

Sample measured displacement data at TCP

| $X_d Y_d X_c Y_c$ (Volts) | Side View $\Delta X, \Delta \phi$ | Top View $\Delta Y, \Delta \psi$ |
|---|---|---|
| 0, 0, 0, 0 | 0 μm, 0° | 0 μm, 0° |
| 20, 0, 0, 0 | −25 μm, 11.1° | 7.1 μm, 2.3° |
| 20, 0, 20, 0 | −45.1 μm, 1.7° | 6.8 μm, 0° |
| 0, 0, 0, 20 | 8.1 μm, 0° | 27.1 μm, 6.2° |
| 0, 20, 0, 20 | 0 μm, 0° | 42.8 μm, 0° |
| 20, 20, 20, 20 | 46.5 μm, 0° | 44.9 μm, 0° |
| 0, 0, 0, 10 | 3.2 μm, 0° | 12.2 μm, 2.2° |
| 0, 10, 0, 10 | 0 μm, 0° | 21.3 μm, 0° |
| 10, 0, 0, 0 | −12.1 μm, 3.1° | 3.1 μm, 0.9° |
| 10, 0, 10, 0 | −23.1 μm, 1° | 3.8 μm, 0° |

The TCP velocity in global coordinates relates to the individual actuator inputs by a robot Jacobian J, given by:

$$\begin{bmatrix} \Delta \dot{X}_f \\ \Delta \dot{Y}_f \\ \Delta \dot{Z}_f \\ \Delta \dot{\varphi} \\ \Delta \dot{\psi} \end{bmatrix} = J \begin{bmatrix} \Delta \dot{X}_D \\ \Delta \dot{Y}_D \\ \Delta \dot{X}_C \\ \Delta \dot{Y}_C \end{bmatrix} \quad (2)$$

The Jacobian is state dependent, but a simple approximation using a constant can be useful for visual servoing. Using a total of 50 data points, the Jacobian entries in Equation (2) are approximated through a linear data fit as:

$$J = \begin{bmatrix} 0.1 & 0 & -0.92 & 1.1 \\ 1.76 & 2.1 & 0.02 & 0.87 \\ 0 & 1.7 & 3.12' & -2.67 \\ 2.1 & 3.12 & -2.67 & 1.76 \\ 0 & 0.92 & 2.43 & 0.86 \end{bmatrix} \quad (3)$$

Knowledge of the Jacobian allows implementing largely decoupled robot joint operation for the microrobot using a servoing command input given by:

$$\begin{bmatrix} \Delta X_D \\ \Delta Y_D \\ \Delta X_C \\ \Delta Y_C \end{bmatrix} = -h \cdot J^+ \begin{bmatrix} \Delta X_f \\ \Delta Y_f \\ \Delta Z_f \\ \Delta \varphi \\ \Delta \psi \end{bmatrix} \quad (4)$$

Where h=0.18 is a scaling constant. This command input was used to generate drive input voltages in order to move the microrobot TCP between repeated locations 25 μm apart as described below.

D. Preliminary Precision-Metrics Evaluation

The prototype repeatability along the four coordinate axes of the TCP was measured, as a preliminary step, using a Veeco® NT 1100 DMEMS surface profiler. Using the system Jacobian shown in Equations (3)~(4), the TCP was guided between two locations in the work volume multiple times (>30) and the sub-micron motion data was captured and processed at 20× magnification to evaluate repeatability of the prototype. At this magnification, the surface profiler provided a resolution of $350 \pm \sigma_{x,y\_error}$ nm along the X and Y axes, and $15 \pm \sigma_{z\_error}$ nm along the Z axis. The bidirectional repeatability determined along the four axes are as shown in Equation set (5). The use of a surface profiler for planar XY motion data, however, limits the repeatability measurements. Further investigation of the system repeatability and resolution will require as scanning electron microscope, as described below.

However, the resolution can be estimated to be on the order of 15~30 nm, based on the electrothermal actuator resolution [20]. The preliminary repeatability measurements indicate that:

$$\sigma_{repeat\_X} \leq 450 \text{ nm}; \; \sigma_{repeat\_Y} \leq 560 \text{ nm}$$

$$\sigma_{repeat\_\phi} \leq 0.009°; \; \sigma_{repeat\_\psi} \leq 0.015° \quad (5)$$

V. Implementation and Further Study

Characteristics of the present microrobots 10 exceed those of other MEMS positioners in categories such as such as range of motion vs. exerted force, and range of motion vs. precision. Details of the robot's configuration and design, fabrication, assembly, and preliminary precision measurement using a Veeco® surface profiler, are provided above. The remainder of this disclosure describe the precision metrics of the robot prototype, including resolution, repeatability and accuracy, and application of the microrobot for nano-indentation on polymer thin films.

A. AFM Tip Mounting

In order to investigate and demonstrate applications of microrobot 10 a nano-manipulation scenario, a Veeco® DP-10 AFM (atomic force microscope) probe was mounted onto the Tool Center Point (e.g., in place of end effector 58), as shown in FIGS. 15A-15E. More particularly, FIG. 15A depicts a portion of the overall robot 10; FIG. 15B depicts the TCP (tip or end effector 58) of cantilever portion 46 of the arm; FIG. 15C depicts arm 18 with an AFM tip mounted to cantilever portion 46; FIG. 15D depicts an enlarged view of an AFM cantilever (tip); and FIG. 15E depicts a 2 μm AFM tip. The AFM tip of FIG. 15E is attached to a micro-fixture on cantilever portion 46 configured with a triangular groove that fits the thin arms of the AFM cantilever of FIG. 15D. Once the AFM cantilever is in place on the micro-fixture, epoxy is dispensed along the groove to bond the AFM cantilever to the micro-fixture. The micro-fixture is coupled to the TCP of cantilever portion 46 of the arm with a compliant snap fastener.

In this way, robot 10 can be configured to replace the traditional cantilever of an atomic force microscope (AFM), or to replace and/or carry the probe and/or probe tip of other scanning probe microscopes (SPM). Embodiments of the present AFMs comprise: a robot (e.g., robot 10, comprising: a first actuator drive having a first shuttle and one or more in-plane actuators coupled to the first shuttle, the first actuator drive configured such that the one or more actuators are actuatable (can be powered or driven) to move the first shuttle along a first plane; an arm having a base portion and a cantilever portion movably coupled to and extending from the base portion, the base portion coupled in fixed relation to the first shuttle of the first actuator drive, the cantilever portion having a distal end with a probe tip; a second actuator drive having a second shuttle and one or more in-plane actuators coupled to the second shuttle, the second actuator drive configured such that the one or more actuators are actuatable (can be powered or driven) to move the second shuttle along a second plane; a cable having a first end coupled to the second shuttle of the second actuator drive and a second end coupled to the cantilever portion of the arm); and a detector module (not shown, but individually known in the art) coupled to the robot for sensing the position of the probe tip. For example, the sensor module can comprise: any suitable imaging sensor(s) (e.g., photodiode(s)), any suitable control electronics, and/or any suitable light sources (e.g., light emitting diode(s)). Examples of commercially available AFM's include the Dimension Icon® from Veeco Instruments [21], XE-150® system from Park Systems [22], and Cypher® from Asylum research [23]. These systems typically span 6~8 ft$^3$.

Figure 16A:
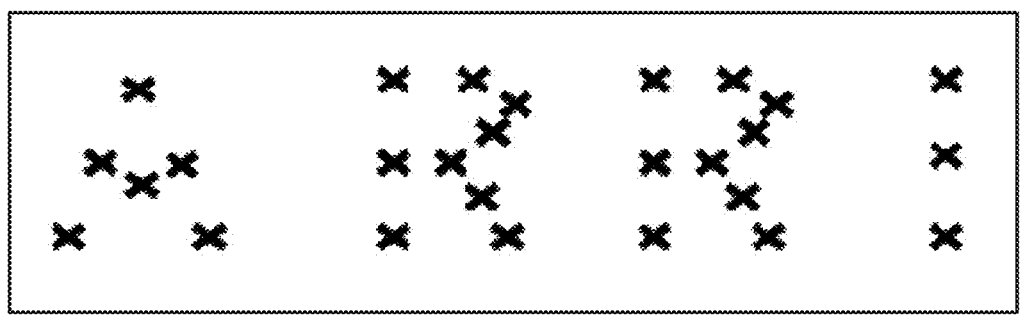
FIGS. 16A-16B depict an image and chart, respectively, of indents generated with a prototype robot.
Figure 16B:
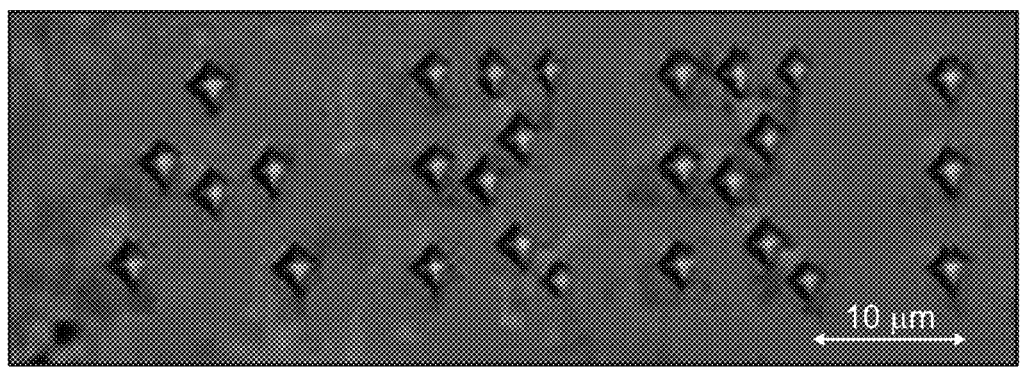

Using the described configuration setup, robot 10 was driven (actuated) to create nano indents on a 2 μm-thick PARYLENE layer. The robot Jacobian described above was used to derive the actuation required for the tip to reach the target locations shown in FIGS. 16A-16B. Finally, the indent locations reached by the robot were used to determine the robot accuracy and repeatability.

B. Accuracy and Repeatability

To estimate the accuracy of the robot, the letters "ARRI" were indented, and before every indent, the AFM tip was brought back to the same initial condition (position). Following the indentation operation, the error in the indent location compared to the target locations desired was used to determine accuracy. In the example shown on FIGS. 16A-16B, a total of 27 points were indented. Using this technique, the average accuracy of the microrobot prototype was measured to be around 500 nm.

To measure the repeatability of the microrobot, the pattern indented was repeated and the actual positions reached were measured by analyzing the polymer surface with a scanning electron microscope (SEM). The repeatability is defined as the variance in the actual positions reached. This is a function of the operating point in the robot's workspace.

FIGS. 17A-17B illustrates the repeatability obtained using the Jacobian derived above, along the XY plane of the polymer. Referring still to FIGS. 17A-17B, the measured repeatability indices $\sigma_{cal\_x,y,z}$ vary as follows in Equation (6):

$$205 \text{ nm} \leq \sigma_{cal\_x} \leq 100 \text{ nm}, 0 \leq x \leq 50 \text{ μm}$$

$$220 \text{ nm} \leq \sigma_{cal\_y} \leq 100 \text{ nm}, 0 \leq y \leq 50 \text{ μm}$$

$$210 \text{ nm} \leq \sigma_{cal\_z} \leq 100 \text{ nm}, 0 \leq z \leq 50 \text{ μm} \tag{6}$$

C. Resolution

Figure 18A:
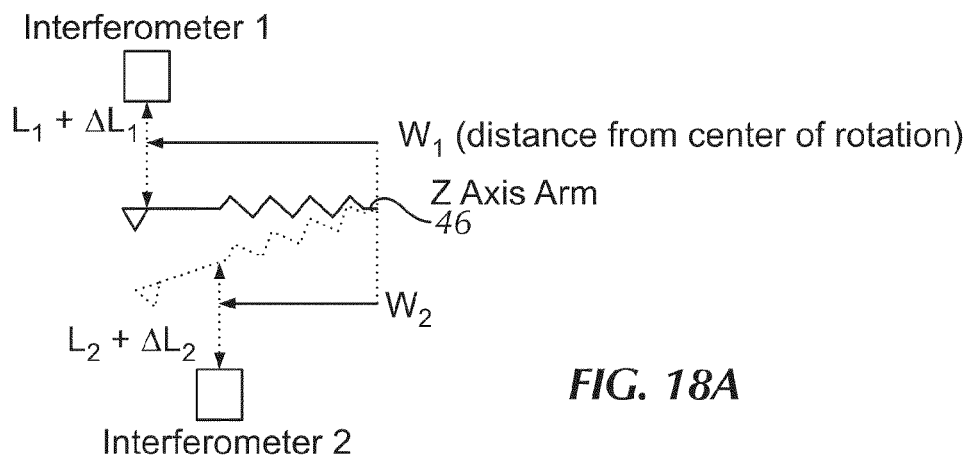
FIGS. 18A-18C conceptually illustrate a laser interferometer configuration and resolution charts of pitch generated with the laser interferometer configuration.
Figure 18B:
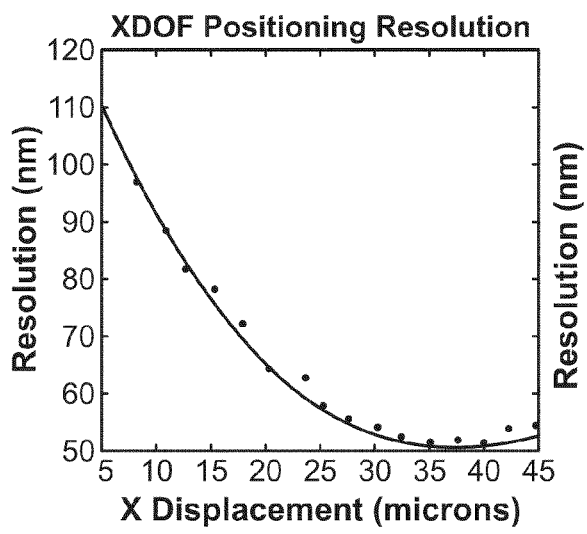
Figure 18C:
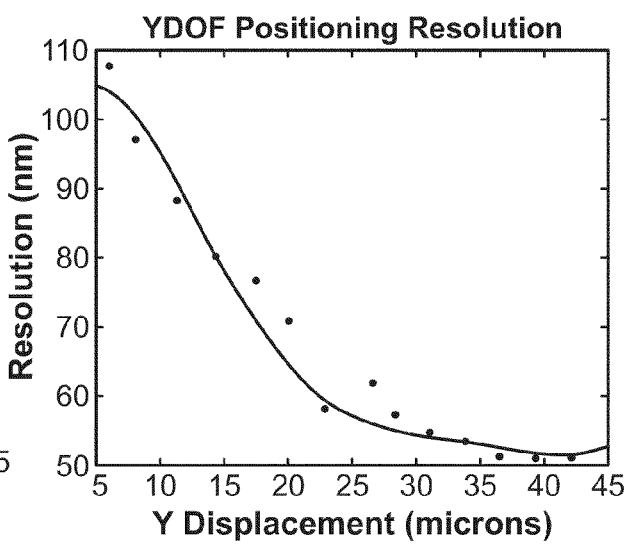

The resolution of the prototype was determined using a laser interferometer setup as shown in FIG. 18A. In the particular embodiment shown, FIGS. 18A-18C illustrates measurement of pitch. Using the Jacobian described above, the electrothermal actuators associated with causing pitch motion were actuated (voltage was increased) until the Keyence LK-G10 laser interferometers detect minimum motion. This voltage varied nonlinearly with pitch actuation between 0.01 V at the center of the work volume to 0.03 V upon reaching extreme points in the 3D envelope (depicted in FIG. 13). Using this setup, the measured resolution can be summarized as shown in Equation (7):

$$110 \text{ nm} \leq \sigma_{res\_x} \leq 50 \text{ nm}, 0 \leq x \leq 50 \text{ μm}$$

$$105 \text{ nm} \leq \sigma_{res\_y} \leq 50 \text{ nm}, 0 \leq y \leq 50 \text{ μm}$$

$$0.035° \leq \sigma_{res\_\phi,\psi} \leq 0.018°, 0 \leq \phi,\psi \leq 9° \tag{7}$$

These measurements represent conservative estimates of the microrobot resolution limited by the Keyence sensor resolution (10 nm+noise).

VI. Nanofactory Configuration Using Multiple AFAM and ARRIpdede Microrobots

The present robots 10 can be coupled to or used in conjunction with ARRIpede robots (e.g., in nanofactories). The ARRIpede robot is described in U.S. patent application Ser. No. 12/583,331, filed Aug. 18, 2009, which is incorporated by reference in its entirety. Embodiments of the present microrobots can be used individually or in parallel on a single substrate, and/or can replace other nanomanipulators (e.g., when the arm is fitted with or comprises other microgrippers).

Figure 19:
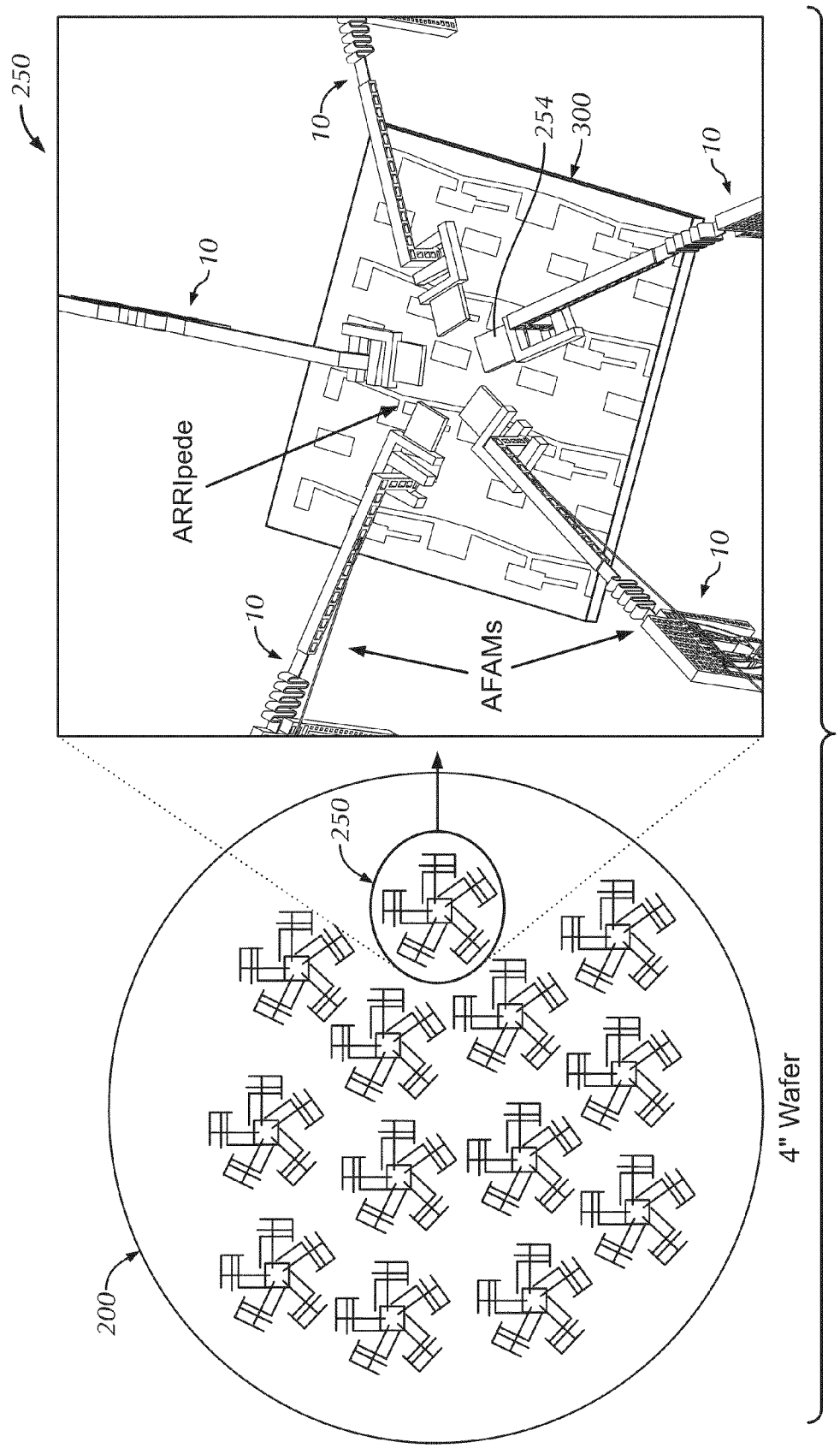
FIG. 19 depicts one of the present microfactories.

FIG. 19 illustrates an embodiment of a microfactory 200, and in the inset, an embodiment of a manipulation module 250. In the embodiment shown, each manipulation module 250 comprises multiple AFAM microrobots 10 with AFM probe tips 254 attached as end effectors, disposed around an inverted ARRIpede microrobot 300.

This permits multiple AFM probes to simultaneously be employed for sensing and manipulation. Thus each nanomanipulation module 250 comprises scanning and manipulation sub modules, as detailed further in Table 3. In this way, for example, a given task can be distributed amongst all modules available or within a sub group. In some embodiments, the nanomanipulation modules will generally (but not necessarily always) operate in a calibrated open loop mode. The microrobot Jacobians can be used to repeatedly drive the probes through a pre-determined trajectory. The elimination of closed loop control can decrease cycle time and increase throughput. The throughput or processing trajectory may vary between robots belonging to the same module 250 and between different modules. The throughput trajectories will, of course, be product specific and include interplay between manipulation and processing. For example, one module 250 can be assigned a first task (e.g., nanotube bending, which might require fixturing the nanotubes using probes and impinging a suitable gas such as oxygen or the like at the specific bend location).

The operation of the nanomanipulation module can be modeled as a stochastic process. Scanning modules that consist of high resolution scanning using scanning probe microscopy (SPM) or imaging using scanning electron microscopy (SEM) can be configured to monitor the state of the nano parts/assemblies before transfer between modules 250. Thus, factory 200 can be housed within a typical SPM or SEM station. In embodiments where the nano-manipulation modules 250 are not actively controlled, the scanning task can also gather information on (and/or monitor) the yield of the processing. Closed-loop manipulation using the scanning module can also be employed as a secondary manipulation process when necessary or otherwise desirable (e.g., for calibration, monitoring, etc.).

Figure 20:
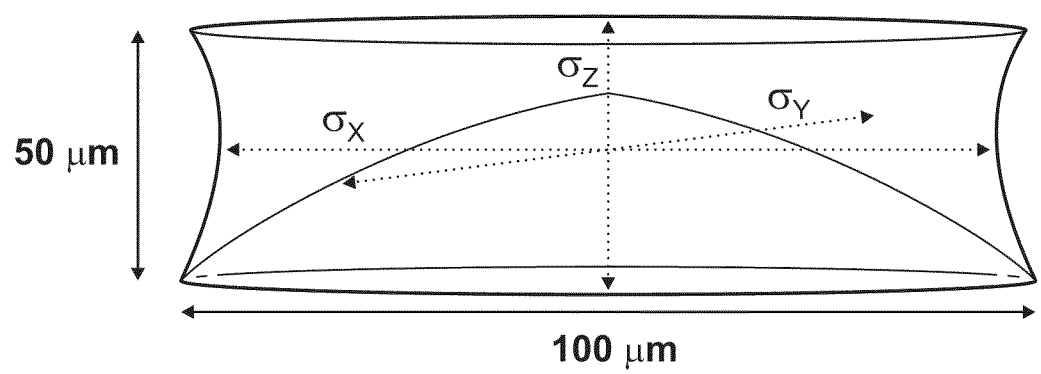
FIG. 20 conceptually illustrates the work volume of one of the present microfactories.

Based on the precision data outlined in the previous sections, embodiment of the present modules 250 occupying a volume of 30 mm$^3$ can be configured to have an almost cylindrical work volume with cylinder diameter of 100 microns and a height of 50 microns or more (e.g., 75 microns), as illustrated conceptually in FIG. 20. For example, such a module 250 can be configured, with five (5) AFAMs 10 and one (1) ARRIpede 300, to have up to 23 DOFs.

TABLE 3

Nano factory scanning and manipulation attributes

| Operation | Scanning | Manipulation |
| --- | --- | --- |
| Technique | SPM, SEM | Probing using MEMS robots + SPM |
| Control | Closed loop (SPM) | Hybrid (open + closed) Open loop using micro robot repeatability or closed loop using SPM tip) |
| Bandwidth | High | Low |
| Frequency of tool usage | Intermittent between manipulation steps | Continuous |
| Sensory | Laser, Electron Beam/ Tunneling current for TEM | Force sensor (designed with micro robot for in-situ sensing) |

In summary, AFAM microrobot 10 has a measured repeatability (in open loop operation) ranging between 100 nm~200 nm and a positioning resolution smaller than 50 nm, and can thus be used for dexterous manipulation and assembly at the nano scale. Due to its force output capacity of up to 100 mN at the end-effector (TCP), embodiments of robot 10 can also be configured to carry various types of nano grippers or sensors. The ARRIpede microrobot has an un-tethered motion repeatability of 6~12 µm, and a resolution of 20 nm along the direction of motion, and can thus complement AFAM robot 10 as a nano-mobile stage. In some embodiments, microfactory 200 can be configured to manufacture microrobots (e.g., AFAM robot 10 or ARRIpeded 300) on a nano-scale, enabling un-tethered operation of such robots.

The various illustrative embodiments of devices, systems, and methods described herein are not intended to be limited to the particular forms disclosed. Rather, they include all modifications, equivalents, and alternatives falling within the scope of the claims. For example, in embodiments, such as the ones depicted above, embodiments of the present robots can comprise piezoelectric actuators in place of the electrothermal actuators (e.g., 34a-1, 34a-2, 34b-1, 34b-2). Another example is the use of alternatives to the cable 22, such as rigid body based mechanisms comprising of revolute joints and links.

The claims are not intended to include, and should not be interpreted to include, means-plus- or step-plus-function limitations, unless such a limitation is explicitly recited in a given claim using the phrase(s) "means for" or "step for," respectively.

REFERENCES

The following references, to the extent that they provide exemplary procedural or other details supplementary to those set forth herein, are specifically incorporated by reference at the locations at which they have been cited.

[1] E. Garcia, M. A. Jimenez, P. G. De Santos, M. Armada, "The evolution of robotics research," Robotics & Automation Magazine, IEEE, Volume 14, Issue 1, March 2007 Pp: 90-103.

[2] M. Gauthier, E. Gibeau, D. Heriban, "Submerged Robotic Micromanipulation and Dielectrophoretic Micro-object Release," in proceedings of 9th International Conference on Control, Automation, Robotics and Vision, ICARCV 2006.

[3] S. Fatikow, J. Seyfriedl, St. Fahlbuschl, A. Buerklel and F. Schmoeckell, "A flexible microrobot-based microassembly station," in Journal of Intelligent and Robotic Systems, Vol 27, No. 1-2, January 2000.

[4] N. Dechev, W. L. Cleghorn, J. K. Mills, "Microassembly of 3D MEMS Structures Utilizing Micogripper with a Robotic Manipulator," in Journal of Microelectromechanical Systems, Vol. 13, No. 2, April 2004.

[5] M. Sitti, H. Hashimoto, "Teleoperated Nano Scale Object Manipulation," in Recent Advances on Mechatronics, Springer-Verlag, O. Kaynak ed., May 1999.

[6] Floyd, S., Pawashe, C., Sitti, M., "An Untethered Magnetically Actuated Micro-Robot Capable of Motion on Arbitrary Surfaces," in proceedings of IEEE International Conference on Robotics and Automation, 2008.

[7] J. J. Abbott, Z. Nagy, F. Beyeler, B. J. Nelson, "Robotics in the Small, Part I: Microrobotics", IEEE Robotics & Automation Magazine, Vol. 14, No. 2, 2007, 92-103.

[8] B. R. Donald et al., "An Untethered, Electrostatic, Globally-Controllable MEMS Micro-Robot," Journal of Microelectromechanical Systems, Vol 15, No. 1, February 2006

[9] M. Sitti, "Teleoperated and automatic nanomanipulation systems using atomic force microscope probes", in proceedings of IEEE International Conference on Decision and Control, December 2003.

[10] Xinyu Liu, "A MEMS Stage for 3-Axis Nanopositioning," Proceedings of the 3rd Annual IEEE Conference on Automation Science and Engineering, Scottsdale, Ariz.

[11] Jingyan Dong, Deepkishore Mukhopadhyay and Placid M Ferreira, "Design, fabrication and testing of a silicon-on-insulator (SOI) MEMS parallel kinematics XY stage," Journal of Micromech. Microeng. 17 (2007) 1154-1161.

[12] J.-Y. Park, Y. Yaish, M. Brink, S. Rosenblatt, P. L. McEuen, "Electrical Nanoprobing of Semiconducting Carbon Nanotubes using an Atomic Force Microscope," in Applied Physics Letters 80, p. 4446 (2002).

[13] R. Yeh Kruglick, E. J. J, Pister, K. S. J, "Surface-micromachined components for articulated microrobots," Journal of Microelectromechanical Systems Volume 5, Issue 1, March 1996 Page(s):10-17.

[14] Beyeler, A. P. Neild, S. Oberti, D. J. Bell, Y. Sun, J. Dual, B. J. Nelson, "Monolithically Fabricated Micro-Gripper with Integrated Force Sensor for Manipulating Micro-Objects and Biological Cells Aligned in an Ultrasonic Field", IEEE/ASME Journal of Microelectromechanical Systems (JMEMS), Vol. 16, No. 1, February 2007, pp. 7-15.

[15] Pierre De Lit, Joël Agnus, Cédric Clévy, Nicolas Chaillet, "A four-degree-of-freedom microprehensile microrobot on chip," Journal of Assembly Automation, 2004, Vol 24, Issue 1, Pp: 33-42.

[16] A. N. Das, P. Zhang, W. H. Lee, D. O. Popa, and H. Stephanou, "μ³: Multiscale, Deterministic Micro-Nano Assembly System for Construction of On-Wafer Microrobots," in Proceedings of IEEE International Conference on Robotics and Automation, Rome, Italy, April 2007.

[17] R. Murthy, A. N. Das, D. O. Popa, "High Yield Assembly of Compliant MEMS Snap Fasteners," in Proceedings of ASME-IDETC, New York, 2008.

[18] R. Murthy, A. N. Das, D. O. Popa, "ARRIpede: A Stick-Slip Micro Crawler/Conveyor Robot Constructed via 2½D MEMS Assembly", IEEE/RSJ International Conference on Intelligent Robots and Systems, Nice, France, September 2008.

[19] D. O. Popa, H. E. Stephanou, "Micro and Meso Scale Robotic Assembly", in SME Journal of Manufacturing Processes, Vol. 6, No. 1, Pp 52-71, 2004.

[20] Jungen, A et al., "A MEMS actuator for integrated carbon nanotube strain sensing," in proceedings of IEEE sensors, November 2005.

[21] http://www.veeco.com/pdfs/brochures/B068-Rev-A0-ICON-brochure-LowRes.pdf

[22] http://www.parkafm.com/

[23] http://www.asylumresearch.com/Products/Mfp3DSA/Mfp3DSA.shtml

[24] Y. Zhou, B. J. Nelson, B. Vikramaditya, "Fusing force and vision feedback for micromanipulation," in Proceedings Of IEEE International Conference on Robotics and Automation, Leuven, Belgium, May 1998.

[25] A. M. Hoover, S. Avadhanula, R. Groff, R. S. Fearing, "A Rapidly Prototyped 2-Axis Positioning Stage for Microassembly Using Large Displacement Compliant Mechanisms", in Proceedings of IEEE International Conference on Robotics and Automation, Orlando, Fla., May 2006.

[26] A. Rizzi, J. Gowdy, R. L. Hollis, "Agile assembly architecture: an agent based approach to modular precision assembly systems," in Proceedings of IEEE International Conference on Robotics and Automation, Volume: 2, pp: 1511-1516, 20-25 Apr. 1997.

[27] V. Crespi, A. Galstyan, K. Lerman, "Top-down vs bottom-up methodologies in multi-agent system design", Journal of Autonomous Robots, Vol. 24, No. 3, pp: 303-313, April, 2008.

[28] R. Murthy, A. N. Das, D. O. Popa, "M³: Multiscale, Deterministic and Reconfigurable Macro-Micro Assembly System for Packaging of MEMS", in Proceedings of IEEE International Conference on Robotics and Automation, Roma, Italy, April 2007.

[29] K. E. Drexler, "Engines of Creation", 1987.

[30] K. Tsui, A. A. Geisberger, M. Ellis, G. D. Skidmore, "Micromachined end-effector and techniques for directed MEMS assembly," Journal of Micromechanics and Microengineering. Vol. 14, pp: 542-549, 2004.

[31] W. H. Lee, B. H. Kang, et. al., "Micropeg manipulation with a compliant microgripper", in Proceedings of IEEE International Conference on Robotics and Automation, Washington, D.C., 2002.

[32] A. N. Das, J. Sin, D. O. Popa, H. E. Stephanou, "On the Precision Alignment and Hybrid Assembly Aspects in Manufacturing of a Microspectrometer", Proceedings of IEEE Conference on Automation Science and Engineering (CASE), pp: 959-966, Washington D.C., USA.

The invention claimed is:

1. A robot comprising:
a first actuator drive having a first shuttle and one or more in-plane actuators coupled to the first shuttle, the first actuator drive configured such that the one or more actuators are actuatable to move the first shuttle along a first plane;
an arm having a base portion and a cantilever portion movably coupled to and extending from the base portion, the base portion coupled in fixed relation to the first shuttle of the first actuator drive;
a second actuator drive having a second shuttle and one or more in-plane actuators coupled to the second shuttle, the second actuator drive configured such that the one or more actuators are actuatable to move the second shuttle along a second plane;
a cable having a first end coupled to the second shuttle of the second actuator drive and a second end coupled to the cantilever portion of the arm.

2. The robot of claim 1, where the second plane is substantially parallel to the first plane.

3. The robot of claim 2, where the second plane is substantially coplanar with the first plane.

4. The robot of claim 3, where the arm is substantially perpendicular to the first plane, and the arm is coupled to the first shuttle with a snap fastener.

5. The robot of claim 1, where the robot is configured such that first and second actuator drives are actuatable to:
(i) translate the base portion of the arm along the first plane; and
(ii) pivot the cantilever portion of the arm relative to the base portion of the arm.

6. The robot of claim 5, where the robot is configured such that the first and second actuator drives are actuatable to:
(i) translate the base portion of the arm in at least two directions along the first plane; and
(ii) pivot the cantilever portion of the arm relative to the base portion of the arm around at least two axes of rotation.

7. The robot of claim 6, where the maximum dimensions of the robot do not exceed 3.2 millimeters (mm)×2.2 mm×1.2 mm, the cantilever portion of the arm comprises an end effector, and the robot is configured such that the actuator drives are actuatable to move the end effector laterally by at least 40 micrometers (μm), longitudinally by at least 40 μm, and vertically by at least 50 μm.

8. The robot of claim 7, where the maximum dimensions of the robot do not exceed 3 mm×2 mm×1 mm.

9. The robot of claim 7, where the robot is configured such that the actuator drives can be actuated to cause the end effector to apply at least 40 milliNewtons (mN) of force to an object in a direction substantially parallel to the first plane.

10. The robot of claim 9, where the robot is configured such that the actuator drives can be actuated to cause the end effector to apply at least 20 mN of force to an object in a direction substantially perpendicular to the first plane.

11. The robot of claim 1, where one or more in-plane actuators of the first actuator drive comprise:
a first actuator configured to be actuated along a first axis;
a second actuator configured to be actuated along a second axis that is substantially perpendicular to the first axis.

12. The robot of claim 11, where the one or more in-plane actuators of the second actuator drive comprise:
a third actuator configured to be actuated along a third axis that is substantially parallel to the first axis;
a fourth actuator configured to be actuated along a fourth axis that is substantially parallel to the second axis.

13. The robot of claim 12, where the actuators of the first and second actuator drives comprise electrothermal chevron actuators.

14. The robot of claim 1, where the cantilever portion of the arm is coupled to the base portion of the arm with a two-axis flexure.

15. The robot of claim 1, where the cantilever portion, base portion, and flexure of the arm are of unitary construction.

16. The robot of claim 1, where the cable has a diameter between 20 µm and 40 µm.

17. The robot of claim 16, where the cable has a diameter between 25 µm and 35 µm.

18. A robot comprising:
- a first actuator drive having a first shuttle and two in-plane actuators coupled to the first shuttle, the first actuator drive configured such that the actuators are actuatable to move the first shuttle along a first plane;
- an arm having a base portion and a cantilever portion movably coupled to and extending from the base portion, the base portion coupled in fixed relation to the first shuttle of the first actuator drive;
- a second actuator drive having a second shuttle and two in-plane actuators coupled to the second shuttle, the second actuator drive configured such that the actuators are actuatable to move the second shuttle along the first plane;
- a cable having a first end coupled to the second shuttle of the second actuator drive and a second end coupled to the cantilever portion of the arm;
- where the maximum dimensions of the robot do not exceed 3.2 mm×2.2 mm×1.2 mm, the cantilever portion of the arm comprises an end effector, and the robot is configured such that the actuator drives are actuatable along the first plane to move the move the end effector laterally by at least 40 µm, longitudinally by at least 40 µm, and vertically by at least 50 µm.

19. An atomic force microscope comprising:
a robot comprising:
- a first actuator drive having a first shuttle and one or more in-plane actuators coupled to the first shuttle, the first actuator drive configured such that the one or more actuators are actuatable to move the first shuttle along a first plane;
- an arm having a base portion and a cantilever portion movably coupled to and extending from the base portion, the base portion coupled in fixed relation to the first shuttle of the first actuator drive, the cantilever portion having a distal end with a probe tip;
- a second actuator drive having a second shuttle and one or more in-plane actuators coupled to the second shuttle, the second actuator drive configured such that the one or more actuators are actuatable to move the second shuttle along a second plane;
- a cable having a first end coupled to the second shuttle of the second actuator drive and a second end coupled to the cantilever portion of the arm; and
a detector module coupled to the robot for sensing the position of the probe tip.

* * * * *

UNITED STATES PATENT AND TRADEMARK OFFICE
CERTIFICATE OF CORRECTION

PATENT NO. : 8,539,854 B2
APPLICATION NO. : 12/587314
DATED : September 24, 2013
INVENTOR(S) : Dan O. Popa et al.

Page 1 of 1

It is certified that error appears in the above-identified patent and that said Letters Patent is hereby corrected as shown below:

In the Claims

In claim 18, column 24, line 3, replace "move the move" with --move the--.

Signed and Sealed this
Nineteenth Day of November, 2013

Teresa Stanek Rea
*Deputy Director of the United States Patent and Trademark Office*